US012709507B2

(12) United States Patent
Motohashi

(10) Patent No.: US 12,709,507 B2
(45) Date of Patent: Aug. 18, 2026

(54) SHEET CONVEYANCE APPARATUS, IMAGE READING APPARATUS, AND IMAGE FORMING APPARATUS

(71) Applicant: CANON KABUSHIKI KAISHA, Tokyo (JP)

(72) Inventor: Shun Motohashi, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/050,714

(22) Filed: Feb. 11, 2025

(65) Prior Publication Data

US 2025/0270064 A1 Aug. 28, 2025

(30) Foreign Application Priority Data

Feb. 26, 2024 (JP) ................................ 2024-026833

(51) Int. Cl.

| | |
|---|---|
| ***B65H 7/08*** | (2006.01) |
| ***B65H 7/18*** | (2006.01) |
| ***G03G 15/22*** | (2006.01) |
| ***H04N 1/00*** | (2006.01) |

(52) U.S. Cl.

CPC ................ *B65H 7/08* (2013.01); *B65H 7/18* (2013.01); *G03G 15/228* (2013.01); *H04N 1/0057* (2013.01); *H04N 1/00702* (2013.01); *H04N 1/00777* (2013.01); *H04N 1/00795* (2013.01); *B65H 2513/10* (2013.01); *B65H 2513/50* (2013.01); *B65H 2553/82* (2013.01); *B65H 2801/39* (2013.01)

(58) Field of Classification Search

CPC ... B65H 7/08; B65H 7/14; B65H 9/20; B65H 2553/82; B65H 2553/416; B65H 2513/10; B65H 7/18; B65H 2301/121; B65H 2513/50; B65H 2513/512; B65H 2801/39

See application file for complete search history.

(56) References Cited

U.S. PATENT DOCUMENTS

| | | | | |
|---|---|---|---|---|
| 7,942,408 | B2 * | 5/2011 | Kato | B65H 7/08 271/226 |
| 10,384,893 | B2 * | 8/2019 | Hasegawa | B65H 5/06 |

FOREIGN PATENT DOCUMENTS

| | | |
|---|---|---|
| JP | 2012101900 A | 5/2012 |

* cited by examiner

*Primary Examiner* — Jeremy R Severson
(74) *Attorney, Agent, or Firm* — ROSSI, KIMMS & McDOWELL LLP

(57) ABSTRACT

A sheet conveyance apparatus includes a conveyance unit, a sensor unit, and a control unit executing a first stop processing of stopping conveyance of a sheet by the conveyance unit when, until a threshold value time has elapsed after one of a first sensor and a second sensor detected the sheet, the other one of them does not detect the sheet, and a speed detection processing of measuring a speed of the sheet conveyed by the conveyance unit based on a detection result of the sensor unit. The control unit sets the threshold value time to a first time when the speed of the sheet measured in the speed detection processing is a first speed, and sets the threshold value time to a second time that is longer than the first time when the speed of the sheet is a second speed that is slower than the first speed.

20 Claims, 12 Drawing Sheets

FIG.4D 240
210
SKEWED SHEET
212
211
215
228
226
SUBSEQUENT SHEET

228b
SUBSEQUENT SHEET
CONVEYANCE DIRECTION
211
SKEWED SHEET
WIDTH DIRECTION
228a 212
211
210
240
SKEWED SHEET
215
228
226
SUBSEQUENT SHEET

228b
SUBSEQUENT SHEET
$\theta_0$
CONVEYANCE DIRECTION
211
SKEWED SHEET
WIDTH DIRECTION
228a 212
211
210
240
MINIMUM SIZE SHEET
215
228
226

228b
MINIMUM SIZE SHEET
CONVEYANCE DIRECTION
211
WIDTH DIRECTION
228a

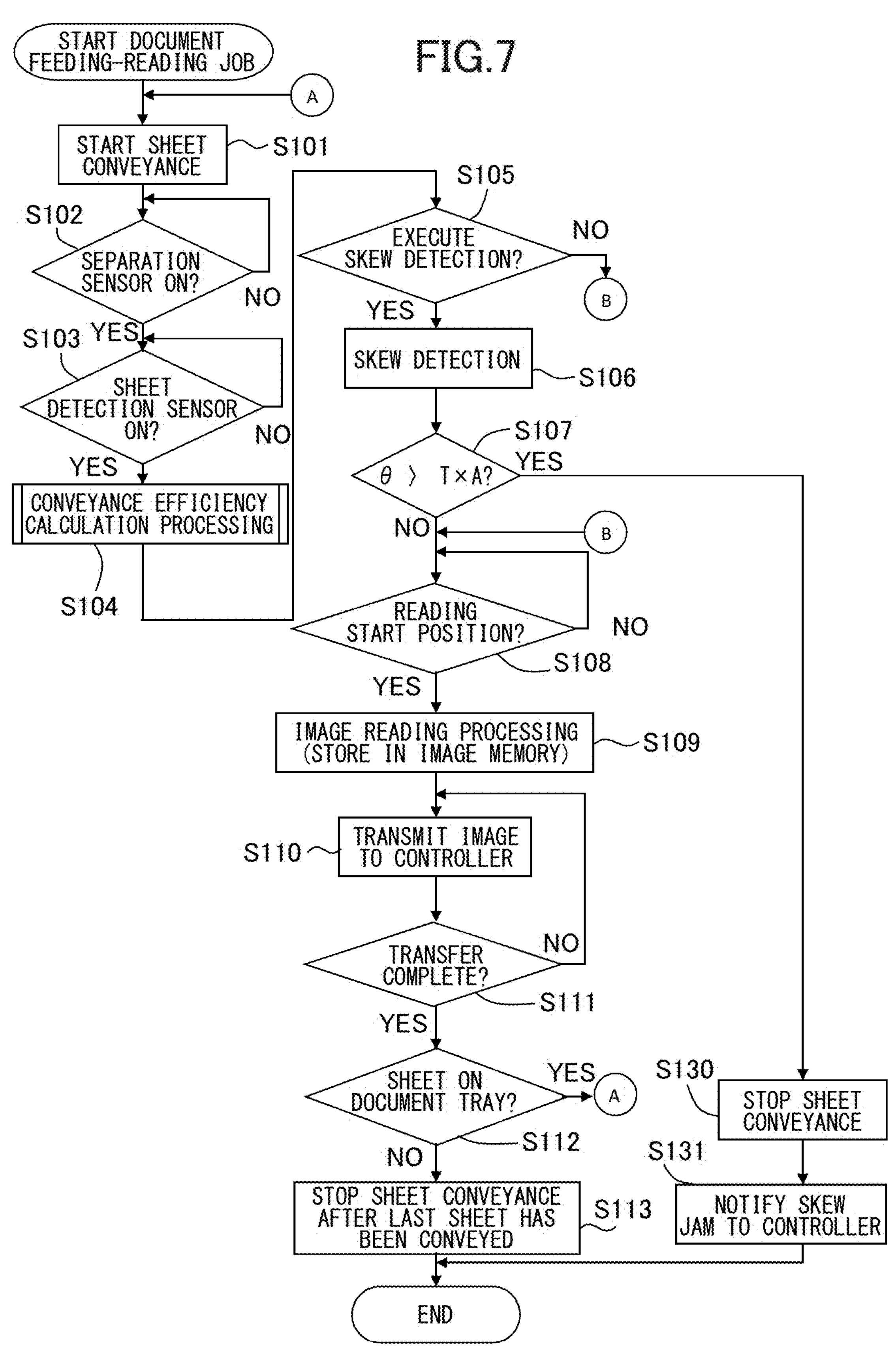

FIG.7
START DOCUMENT FEEDING-READING JOB
A
START SHEET CONVEYANCE
S101
S102
SEPARATION SENSOR ON?
NO
YES
S103
SHEET DETECTION SENSOR ON?
NO
YES
CONVEYANCE EFFICIENCY CALCULATION PROCESSING
S104
S105
EXECUTE SKEW DETECTION?
NO
B
YES
SKEW DETECTION
S106
S107
θ 〉 T×A?
YES
NO
B
READING START POSITION?
NO
S108
YES
IMAGE READING PROCESSING (STORE IN IMAGE MEMORY)
S109
S110
TRANSMIT IMAGE TO CONTROLLER
TRANSFER COMPLETE?
NO
S111
YES
SHEET ON DOCUMENT TRAY?
YES
A
S112
NO
STOP SHEET CONVEYANCE AFTER LAST SHEET HAS BEEN CONVEYED
S113
S130
STOP SHEET CONVEYANCE
S131
NOTIFY SKEW JAM TO CONTROLLER
END

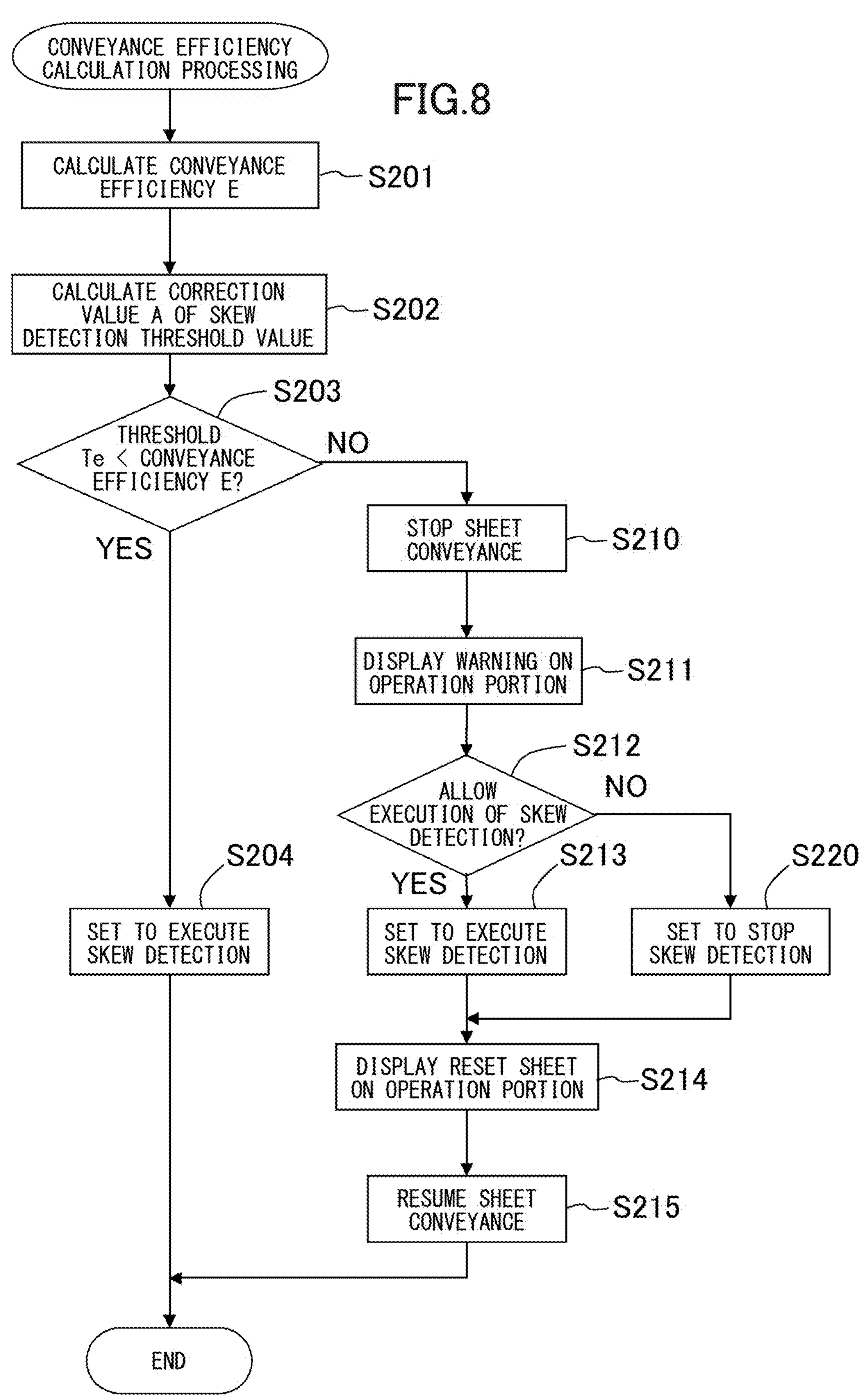
CONVEYANCE EFFICIENCY CALCULATION PROCESSING
FIG.8
CALCULATE CONVEYANCE EFFICIENCY E
S201
CALCULATE CORRECTION VALUE A OF SKEW DETECTION THRESHOLD VALUE
S202
S203
THRESHOLD Te < CONVEYANCE EFFICIENCY E?
NO
YES
STOP SHEET CONVEYANCE
S210
DISPLAY WARNING ON OPERATION PORTION
S211
S212
ALLOW EXECUTION OF SKEW DETECTION?
NO
YES
S204
S213
S220
SET TO EXECUTE SKEW DETECTION
SET TO EXECUTE SKEW DETECTION
SET TO STOP SKEW DETECTION
DISPLAY RESET SHEET ON OPERATION PORTION
S214
RESUME SHEET CONVEYANCE
S215
END

Figure 9:
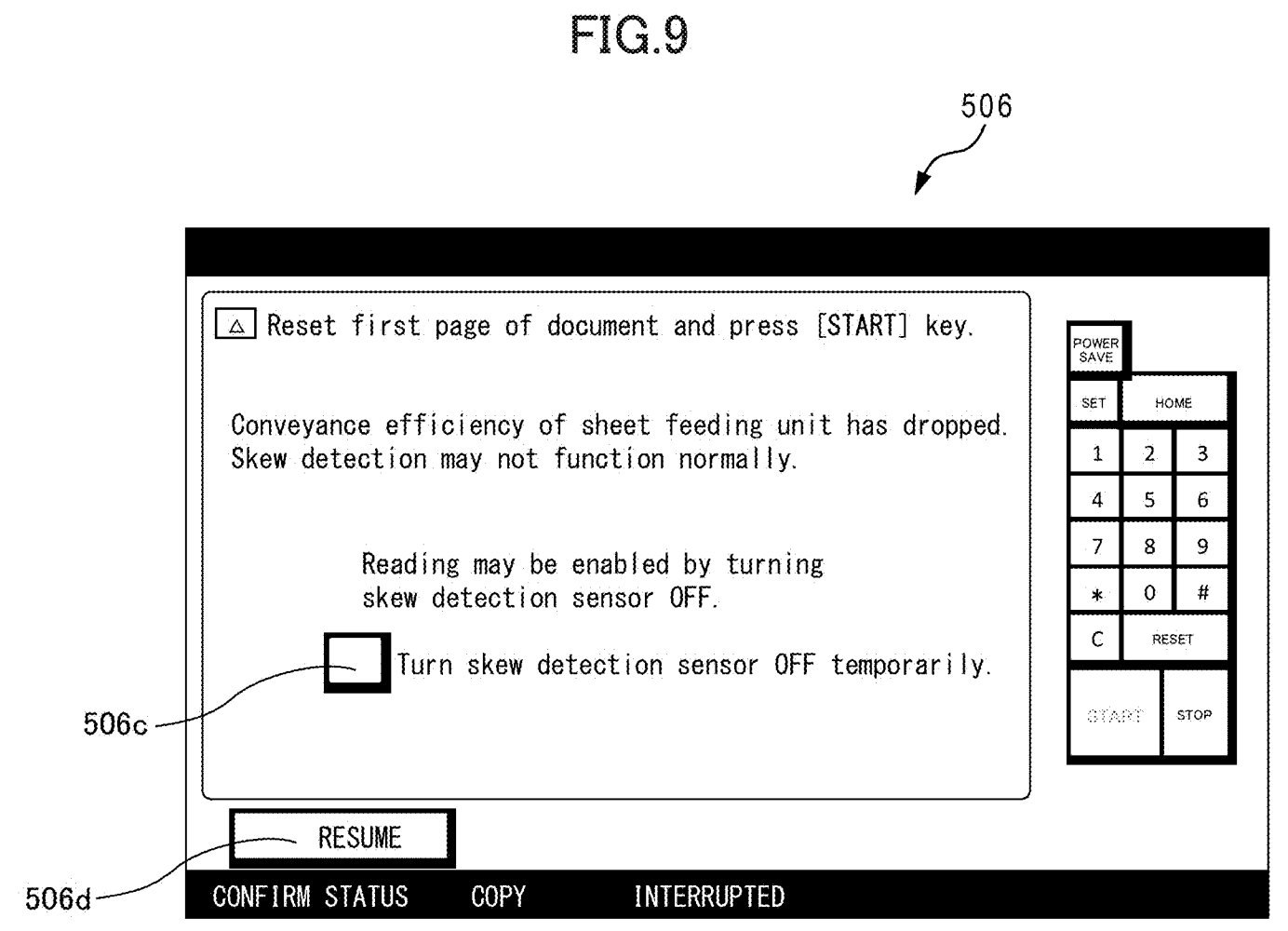

△ Reset first page of document and press [START] key.

Conveyance efficiency of sheet feeding unit has dropped.
Skew detection may not function normally.

Reading may be enabled by turning
skew detection sensor OFF.

Turn skew detection sensor OFF temporarily.

RESUME

CONFIRM STATUS COPY INTERRUPTED

POWER SAVE

SET HOME 1 2 3

4 5 6

7 8 9

* 0 #

C RESET

START STOP

506c

506d

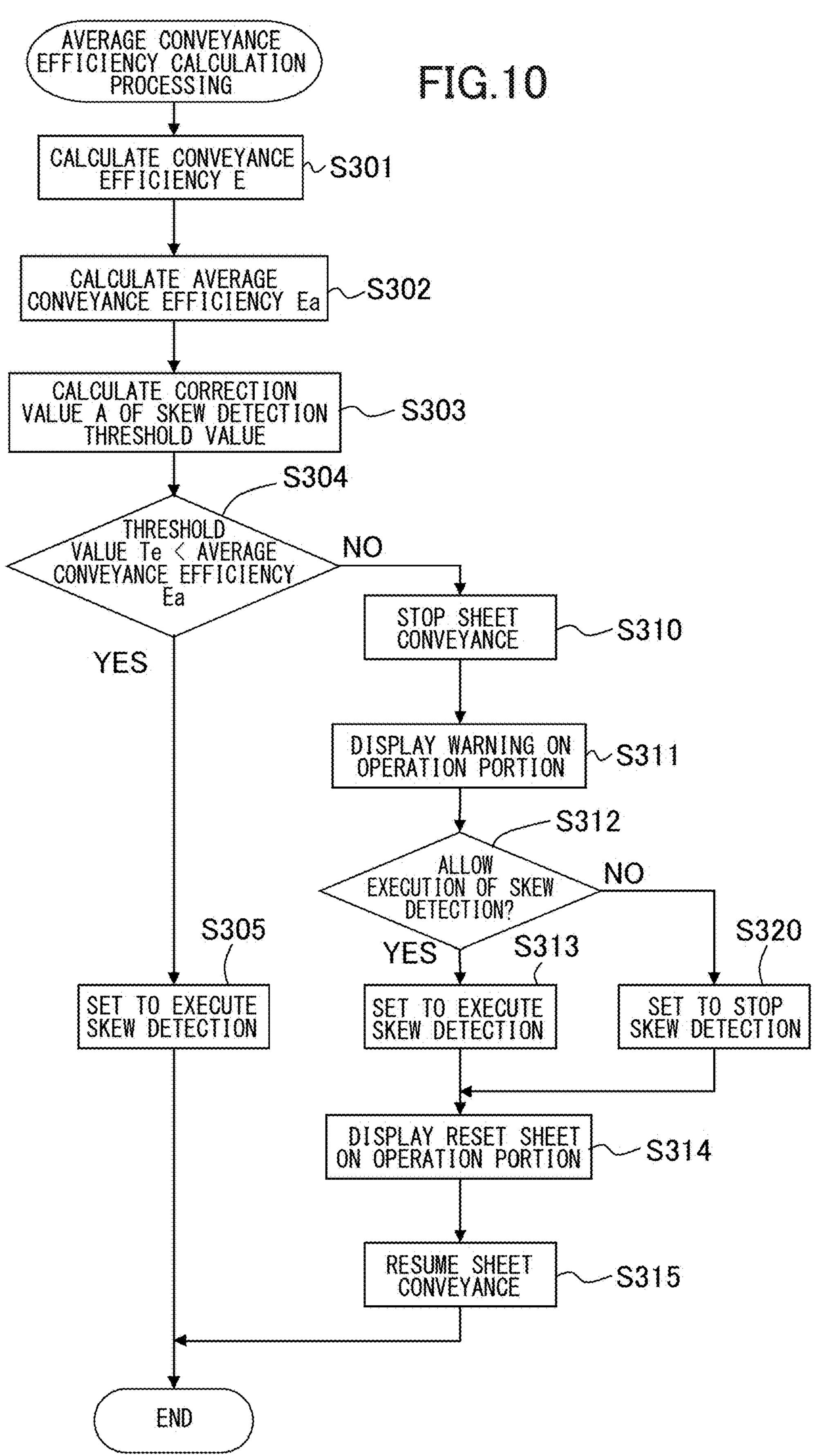

FIG.10
AVERAGE CONVEYANCE EFFICIENCY CALCULATION PROCESSING
CALCULATE CONVEYANCE EFFICIENCY E
S301
CALCULATE AVERAGE CONVEYANCE EFFICIENCY Ea
S302
CALCULATE CORRECTION VALUE A OF SKEW DETECTION THRESHOLD VALUE
S303
S304
THRESHOLD VALUE Te < AVERAGE CONVEYANCE EFFICIENCY Ea
NO
YES
STOP SHEET CONVEYANCE
S310
DISPLAY WARNING ON OPERATION PORTION
S311
S312
ALLOW EXECUTION OF SKEW DETECTION?
NO
YES
S305
S313
S320
SET TO EXECUTE SKEW DETECTION
SET TO EXECUTE SKEW DETECTION
SET TO STOP SKEW DETECTION
DISPLAY RESET SHEET ON OPERATION PORTION
S314
RESUME SHEET CONVEYANCE
S315
END

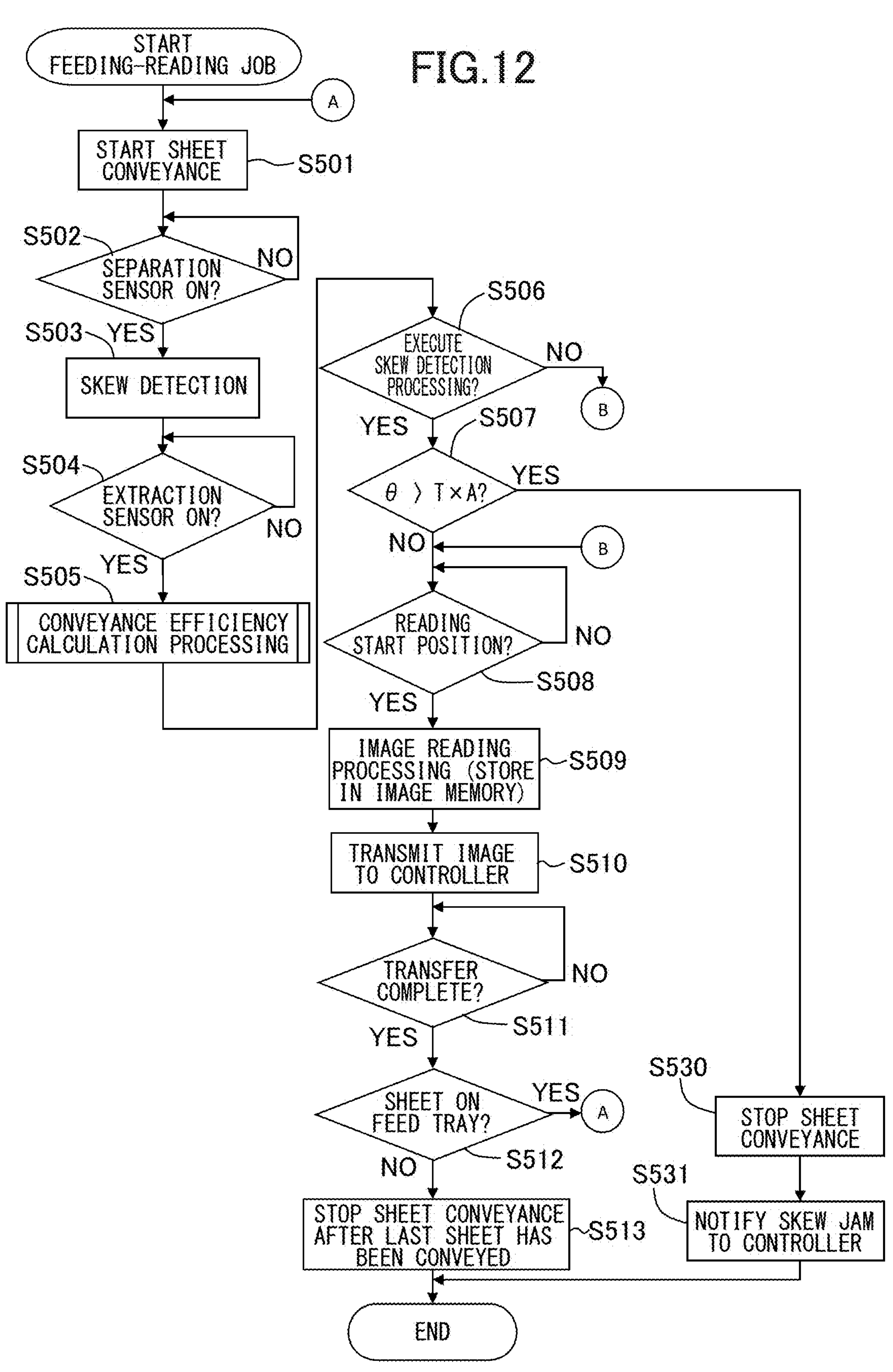
FIG.12
START FEEDING-READING JOB
A
START SHEET CONVEYANCE
S501
S502
SEPARATION SENSOR ON?
NO
S503
YES
SKEW DETECTION
S504
EXTRACTION SENSOR ON?
NO
YES
S505
CONVEYANCE EFFICIENCY CALCULATION PROCESSING
S506
EXECUTE SKEW DETECTION PROCESSING?
NO
B
YES
S507
θ 〉 T×A?
YES
NO
B
READING START POSITION?
NO
S508
YES
IMAGE READING PROCESSING (STORE IN IMAGE MEMORY)
S509
TRANSMIT IMAGE TO CONTROLLER
S510
TRANSFER COMPLETE?
NO
S511
YES
SHEET ON FEED TRAY?
YES
A
S512
NO
STOP SHEET CONVEYANCE AFTER LAST SHEET HAS BEEN CONVEYED
S513
S530
STOP SHEET CONVEYANCE
S531
NOTIFY SKEW JAM TO CONTROLLER
END

SHEET CONVEYANCE APPARATUS, IMAGE READING APPARATUS, AND IMAGE FORMING APPARATUS

BACKGROUND OF THE INVENTION

Field of the Invention

The present invention relates to a sheet conveyance apparatus, an image reading apparatus, and an image forming apparatus for conveying sheets.

Description of the Related Art

Document conveying apparatuses, such as automatic document feeders, hereinafter referred to as ADF, equipped in image reading apparatuses attached to copying machines and facsimile machines are widely used. In sheet conveyance apparatuses installed in such document conveying apparatuses, a technique is known to use a plurality of sheet detection sensors provided in the conveyance unit to detect inclination of a leading edge portion of sheets being conveyed, which is hereinafter referred to as skew detection. This technique involves arranging a plurality of sheet detection sensors at different positions in a sheet width direction on a conveyance path, and detecting skewing of the sheet based on a difference between timings at which the conveyed sheet has been detected by the respective sensors.

For example, in the ADF, if a document bundle including documents, hereinafter referred to as width mixed state documents, having different lengths in a width direction orthogonal to a sheet conveyance direction, hereinafter referred to as a main scanning direction, has been placed, a side regulating plate of a tray is fixed to correspond to a sheet having the longest length in the main canning direction. Therefore, smaller sheets will be conveyed in a state where skewing tends to occur. Therefore, a technique has been developed that reduces the possibility of erroneous detection of skewing by setting a high determination threshold value for skew detection when the width mixed state documents have been set (refer to Japanese Patent Application Laid-Open Publication No. 2012-101900).

However, according to the sheet conveyance apparatus taught in Japanese Patent Application Laid-Open Publication No. 2012-101900 described above, if a conveyance speed of sheets becomes slower than assumed, such as due to wear of the conveyance roller or attachment of paper dusts, the difference between detection timings of the sheet detection sensors will be increased. Therefore, the skew amount of the sheet will be calculated as a high amount, and there is a drawback in that even if the actual skew amount falls below a threshold value to stop conveyance, it may be erroneously determined that the skew amount exceeds the threshold value, such that the accuracy of skew detection of sheets will be deteriorated.

The present invention provides a sheet conveyance apparatus, an image reading apparatus, and an image forming apparatus capable of suppressing deterioration of accuracy of skew detection of sheets.

SUMMARY OF THE INVENTION

According to a first aspect of the present invention, a sheet conveyance apparatus includes a supporting unit configured to support sheets, a conveyance unit configured to separate the sheets supported on the supporting unit one by one and convey the sheets one sheet at a time in a conveyance direction, a sensor unit including a first sensor configured to detect the sheet conveyed by the conveyance unit at a first detection position, and a second sensor configured to detect the sheet conveyed by the conveyance unit at a second detection position that differs from the first detection position in a width direction orthogonal to the conveyance direction, and a control unit configured to execute a first stop processing of stopping conveyance of the sheet by the conveyance unit in a case where, until a threshold value time has elapsed after one of the first sensor and the second sensor has detected the sheet, the other one of the first sensor and the second sensor does not detect the sheet, and a speed detection processing of measuring a speed of the sheet conveyed by the conveyance unit based on a detection result of the sensor unit. The control unit is configured to set the threshold value time to a first time in a case where the speed of the sheet measured in the speed detection processing is a first speed, and set the threshold value time to a second time that is longer than the first time in a case where the speed of the sheet measured in the speed detection processing is a second speed that is slower than the first speed.

According to a second aspect of the present invention, a sheet conveyance apparatus includes a supporting unit configured to support sheets, a conveyance unit configured to separate the sheets supported on the supporting unit one by one and convey the sheets one sheet at a time in a conveyance direction, a sensor unit including a first sensor configured to detect the sheet conveyed by the conveyance unit at a first detection position, and a second sensor configured to detect the sheet conveyed by the conveyance unit at a second detection position that differs from the first detection position in a width direction orthogonal to the conveyance direction, and a control unit configured to execute a first stop processing of stopping conveyance of the sheet by the conveyance unit in a case where skewing of the sheet has been detected based on a detection result of the sensor unit, and a speed detection processing of measuring a speed of the sheet conveyed by the conveyance unit based on the detection result of the sensor unit. In a state where a speed of the sheet measured in the speed detection processing is slower than a threshold value speed, the control unit is configured to selectively execute a first mode of executing the first stop processing, or a second mode of not executing the first stop processing.

According to a third aspect of the present invention, a sheet conveyance apparatus includes an image reading apparatus includes the sheet conveyance apparatus, and an image reading unit configured to read an image formed on a sheet conveyed by the sheet conveyance apparatus.

According to a fourth aspect of the present invention, an image forming apparatus includes the image reading apparatus, and an image forming unit configured to form an image on a sheet based on an information of an image read by the image reading apparatus.

Further features of the present invention will become apparent from the following description of exemplary embodiments with reference to the attached drawings.

BRIEF DESCRIPTION OF THE DRAWINGS

FIG. 4A is a cross-sectional view of the image reading apparatus according to the embodiment from the front side in a case where a skew amount is small when a bound sheet is fed.

FIG. 4B is a plan view of the image reading apparatus according to the embodiment in a case where the skew amount is small when a bound sheet is fed.

FIG. 4C is a cross-sectional view of the image reading apparatus according to the embodiment in a case where the skew amount is great when a bound sheet is fed.

FIG. 4D is a plan view of the image reading apparatus according to the embodiment in a case where the skew amount is great when a bound sheet is fed.

FIG. 7 is a flowchart illustrating a processing procedure of performing skew detection based on a conveyance efficiency in the image reading apparatus according to the present embodiment.

FIG. 8 is a flowchart illustrating a processing procedure of calculating the conveyance efficiency in the image reading apparatus according to the present embodiment.

FIG. 9 is a screen displayed on the operation portion according to the embodiment in a case where conveyance has been stopped due to deterioration of conveyance efficiency.

FIG. 10 is a flowchart illustrating a processing procedure of calculating an average conveyance efficiency in an image reading apparatus according to another embodiment.

FIG. 12 is a flowchart illustrating a processing procedure of determining skew detection after waiting for calculation of conveyance efficiency in the image reading apparatus according to another embodiment.

DESCRIPTION OF THE EMBODIMENTS

Now, an embodiment according to the present invention will be described in detail with reference to FIGS. 1 to 9. In the present embodiment, an example has been described in a case where a mono-color printer of an electrophotographic system has been adopted as an image forming apparatus 1. However, the present invention is not limited to the image forming apparatus 1 of a mono-color printer adopting the electrophotographic system, and it may be a full-color printer, and even further, it may be applied to a tandem-type or an inkjet-recording type image forming apparatus.

Image Forming Apparatus

Figure 1:
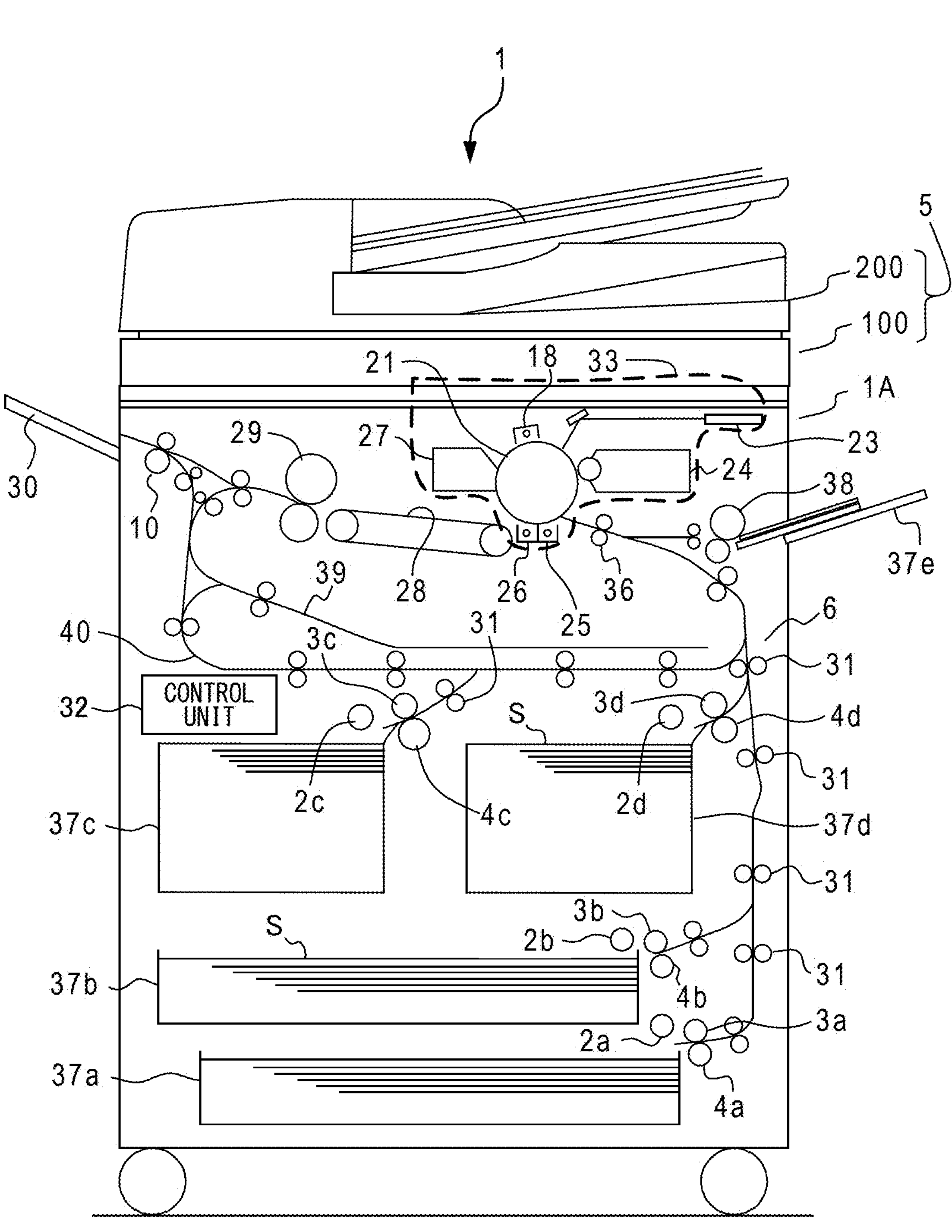
FIG. 1 is a cross-sectional view illustrating an image forming apparatus according to an embodiment from a front side.

A general configuration of the image forming apparatus 1 equipped with an image reading apparatus 5 will be described with reference to FIG. 1. FIG. 1 is a cross-sectional view of the image forming apparatus 1 according to the present embodiment. In the following description, a position at which the user faces an operation portion not shown to perform various input and settings of the image forming apparatus 1 is defined as a "front direction" of the image forming apparatus 1, and a rear side is defined as a "rear direction" thereof. That is, FIG. 1 illustrates an internal configuration of the image forming apparatus 1 viewed from the front direction.

An apparatus body 1A includes an image forming unit 33 for forming images on sheets S serving as recording media, and a sheet feeding unit 6 for feeding sheets S to the image forming unit 33. The sheet feeding unit 6 includes sheet storage portions 37*a*, 37*b*, 37*c*, and 37*d* that may store sheets of different sizes. The sheets stored in each of the sheet storage portions 37*a*, 37*b*, 37*c*, and 37*d* are fed by pickup rollers 2*a*, 2*b*, 2*c*, and 2*d*. Then, the sheets are separated one by one by feed rollers 3*a*, 3*b*, 3*c*, and 3*d* and retard rollers 4*a*, 4*b*, 4*c*, and 4*d*, and transferred to a corresponding conveyance roller pair 31. By being transferred sequentially by a plurality of conveyance roller pairs 31 disposed along a sheet conveyance path, the sheets S are conveyed to a registration roller pair 36.

The sheet S placed on a manual feed tray 37*e* by a user is fed by a feed roller 38 to an inner side of the apparatus body 1A, and conveyed to the registration roller pair 36. The registration roller pair 36 stops a leading edge of the sheet S to thereby correct skewing of the sheet S, and resumes conveyance of the sheet S at a matched timing with an image creating operation, which is a process of forming a toner image in the image forming unit 33.

The image forming unit 33 creates an image on the sheet S based on information of an image read by the image reading apparatus 5. The image forming unit 33 is an electrophotographic system unit equipped with a photosensitive drum 21 serving as a photosensitive member. The photosensitive drum 21 is rotatable along a conveyance direction of the sheet S, and a charging unit 18, an exposing unit 23, a developing unit 24, a transfer charging unit 25, a separation charging unit 26, and a cleaner 27 are arranged on the circumference of the photosensitive drum 21. The charging unit 18 charges a surface of the photosensitive drum 21 uniformly. The exposing unit 23 exposes the photosensitive drum 21 based on image information entered from the image reading apparatus 5, and forms an electrostatic latent image on the photosensitive drum 21.

The developing unit 24 stores a two-component developer containing toner and carrier, and by supplying charged toner to the photosensitive drum 21, an electrostatic latent image is developed as a toner image. The toner image borne on the photosensitive drum 21 is transferred to the sheet S conveyed from the registration roller pair 36 by a bias electric field formed by the transfer charging unit 25. The sheet S on which the toner image has been transferred is separated from the photosensitive drum 21 by a bias electric field formed at the separation charging unit 26, and conveyed toward a fixing unit 29 by a pre-fixing conveyance unit 28. Attached substances such as transfer residual toner remaining on the photosensitive drum 21 without being transferred to the sheet S are removed by the cleaner 27, and the photosensitive drum 21 prepares for the next image creating operation.

The sheet S conveyed to the fixing unit 29 is nipped by the roller pair while being heated and pressed, by which the toner is melted and solidified, and the image is fixed thereto. If the image output is completed, the sheet S to which the image has been fixed is discharged via a sheet discharge roller pair 10 to a sheet discharge tray 30 protruded to an outer side of the apparatus body 1A. During duplex printing, in a state where an image is to be formed on a back surface of the sheet S, the sheet S having passed through the fixing unit 29 is turned upside down at a reverse portion 39 such that a front surface and the back surface thereof are reversed, and the sheet S is conveyed via a duplex conveyance unit 40 to the registration roller pair 36. Then, the sheet S having an image formed thereto again by the image forming unit 33 is discharged onto the sheet discharge tray 30.

Image Reading Apparatus

The image reading apparatus 5 arranged above the apparatus body 1A of the image forming apparatus 1 includes a scanner unit 100 and an automatic document feeder (ADF) 200, through which the document is optically scanned and image information is read therefrom. The image information converted into an electric signal by the image reading apparatus 5 is transferred via a controller 500 (refer to FIG. 3) to a control unit 32 disposed on the apparatus body 1A. Thereby, the image forming apparatus 1 forms an image on a recording medium based on the image information read by the image reading apparatus 5.

Figure 2:
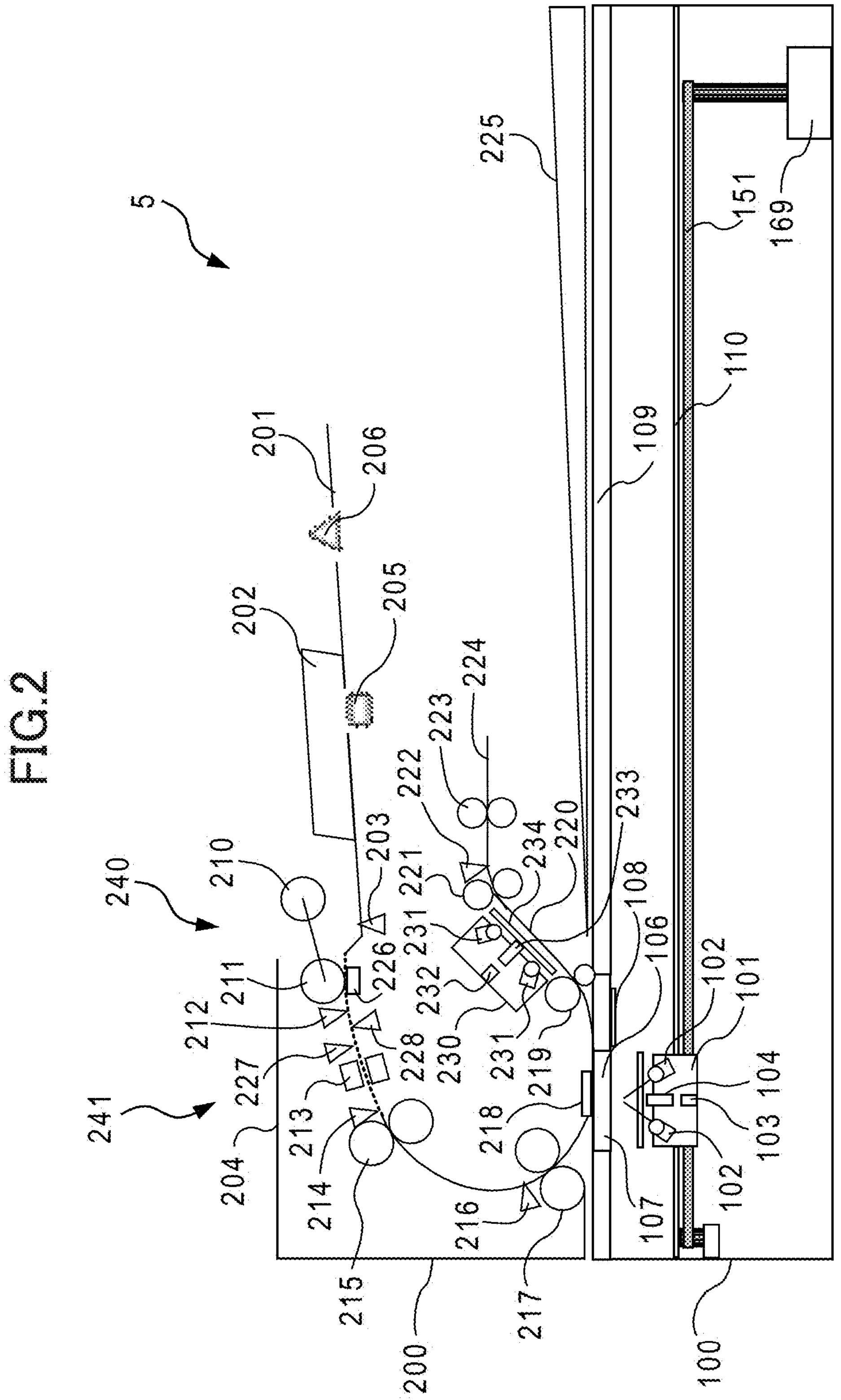
FIG. 2 is a cross-sectional view illustrating an image reading apparatus according to the embodiment from the front side.

FIG. 2 is a cross-sectional view illustrating one example of the image reading apparatus 5 according to the present embodiment. The scanner unit 100 includes a front surface reading unit 101, a white reference member 108, a platen glass 109, a guide 110, a timing belt 151, and a reading unit motor 169. The scanner unit 100 drives the reading unit motor 169 to move the front surface reading unit 101 along the guide 110 via the timing belt 151 while reading the front surface of the document placed on the platen glass 109 one line at a time to read the image.

The front surface reading unit 101 is an example of an image reading unit that reads the image formed on the sheet conveyed by a feeding unit 7. A contact image sensor, hereinafter referred to as CIS, may be used as the front surface reading unit 101. A document feeding-reading glass 106 reads an image on a document conveyed by the ADF 200 onto the document feeding-reading glass 106 by the front surface reading unit 101.

The ADF 200 includes the feeding unit 7, which is one example of a sheet conveyance apparatus, a registration roller pair 215, a back surface reading unit 230, and a sheet discharge tray 225. The feeding unit 7 includes a document tray 201, which is an example of a supporting unit that supports a document bundle composed of one or more documents, a guide width regulation plate 202, a width detection sensor 205, a conveyance unit 240, and a sensor unit 241. The conveyance unit 240 includes a separation roller 211 and a pickup roller 210, and separates the sheets S supported on the document tray 201 one by one to convey the sheets S one sheet at a time in the conveyance direction.

The guide width regulation plate 202 is disposed on the document tray 201, swings in a width direction, i.e., main scanning direction, orthogonal to a document conveyance direction, and regulates movement of the document in the main scanning direction. The width detection sensor 205 acquires a width information according to the swing of the guide width regulation plate 202. The separation roller 211 and the pickup roller 210 are a separation mechanism that separates the documents one by one, and regulates the document bundle from projecting from the document tray 201 and moving downstream prior to the starting of conveyance of the document. By having the pickup roller 210 fall on and rotate against an uppermost surface of the document bundle placed on the document tray 201, the document on the uppermost surface of the document bundle is conveyed. Regarding the documents conveyed by the pickup roller 210, the uppermost sheet is caused to be separated and conveyed by the operation of the separation roller 211. The separation is realized by a known separation technique.

When the document separated by the separation roller 211 turns on a separation sensor 212, a timer count is started. This count is used as a value for calculating a detection start timing of a multi-feed detection sensor 213, or for calculating a document length. Thereafter, when the document reaches a vicinity of the multi-feed detection sensor 213, multi-feed detection is started. Thereafter, the document is passed through a registration sensor 214 and conveyed to the registration roller pair 215, where it is abutted against a nip position of the registration roller pair 215. A leading edge portion of the abutted document is formed into a loop shape, and thereby, skewing of the document during conveyance is resolved.

A first sheet detection sensor **228*a* serving as an example of a first sensor and a second sheet detection sensor 228*b* serving as an example of a second sensor are arranged downstream in the conveyance direction of the separation sensor 212. The first sheet detection sensor 228*a* detects a sheet conveyed by the conveyance unit 240 at a first detection position. The second sheet detection sensor 228*b* detect the sheet conveyed by the conveyance unit 240 at a second detection position that differs from the first detection position in a width direction orthogonal to the conveyance direction. The first sheet detection sensor 228*a* and the second sheet detection sensor 228*b* detects a skew angle of a leading edge of a document regarding the document on an uppermost surface of the document bundle that has been separated and conveyed by the conveyance unit 240 from the document tray 201. Further according to the present embodiment, the separation sensor 212 is an example of a third sensor, which detects a sheet conveyed by the conveyance unit 240 at a third detection position that differs from both the first detection position and the second detection position in the conveyance direction. In the present embodiment, the first sheet detection sensor 228*a*, the second sheet detection sensor 228*b*, and the separation sensor 212 constitute the sensor unit 241**.

A conveyance path that conveys a document having passed through the registration roller pair 215 toward the document feeding-reading glass 106 is arranged downstream of the registration roller pair 215. When a document sent to the conveyance path turns on a read sensor 216, a timer 171 of FIG. 3 described later is triggered to set a timer until a leading edge of the document reaches a document front surface reading position 107. In the case of duplex reading, similarly, a timer is set until the leading edge of the document reaches a document back surface reading position 220. Thereafter, the document is conveyed by a read roller pair 217 to the document front surface reading position 107.

When the timer 171 expires the timer for reading the front surface, reading of the front surface of the document is started. Specifically, the document being conveyed on the document feeding-reading glass 106 is irradiated by a front surface LED 102 in the front surface reading unit 101 from below the glass. A reflected light thereof is read by a front surface line sensor 103 through a front surface lens array 104 to thereby read the front surface image of the document. While having the front surface of the document read, the document is conveyed from the document front surface reading position 107 via a read roller pair 219 to the document back surface reading position 220.

When a back surface reading timer is expired in the timer 171, reading of the back surface is started. In the case of duplex reading, a back surface of the document is irradiated by a back surface LED 231 in the back surface reading unit 230 when being conveyed above a back surface white opposing member that is integrated with a back surface document feeding-reading glass 234. By reading the reflected light by a back surface line sensor 232, which is a CIS, through a back surface lens array 233, a back surface image of the document is read. After passing through the document back surface reading position 220, the document is conveyed to a read roller pair 221, and discharged by a sheet discharge roller pair 223 onto the sheet discharge tray 225.

According to the present embodiment, an example where CIS is adopted as the front surface reading unit 101 and the back surface reading unit 230 was explained, but the present technique is not limited thereto. For example, a CCD composed of an optical reduction system using mirrors may be adopted.

Control System

Figure 3:
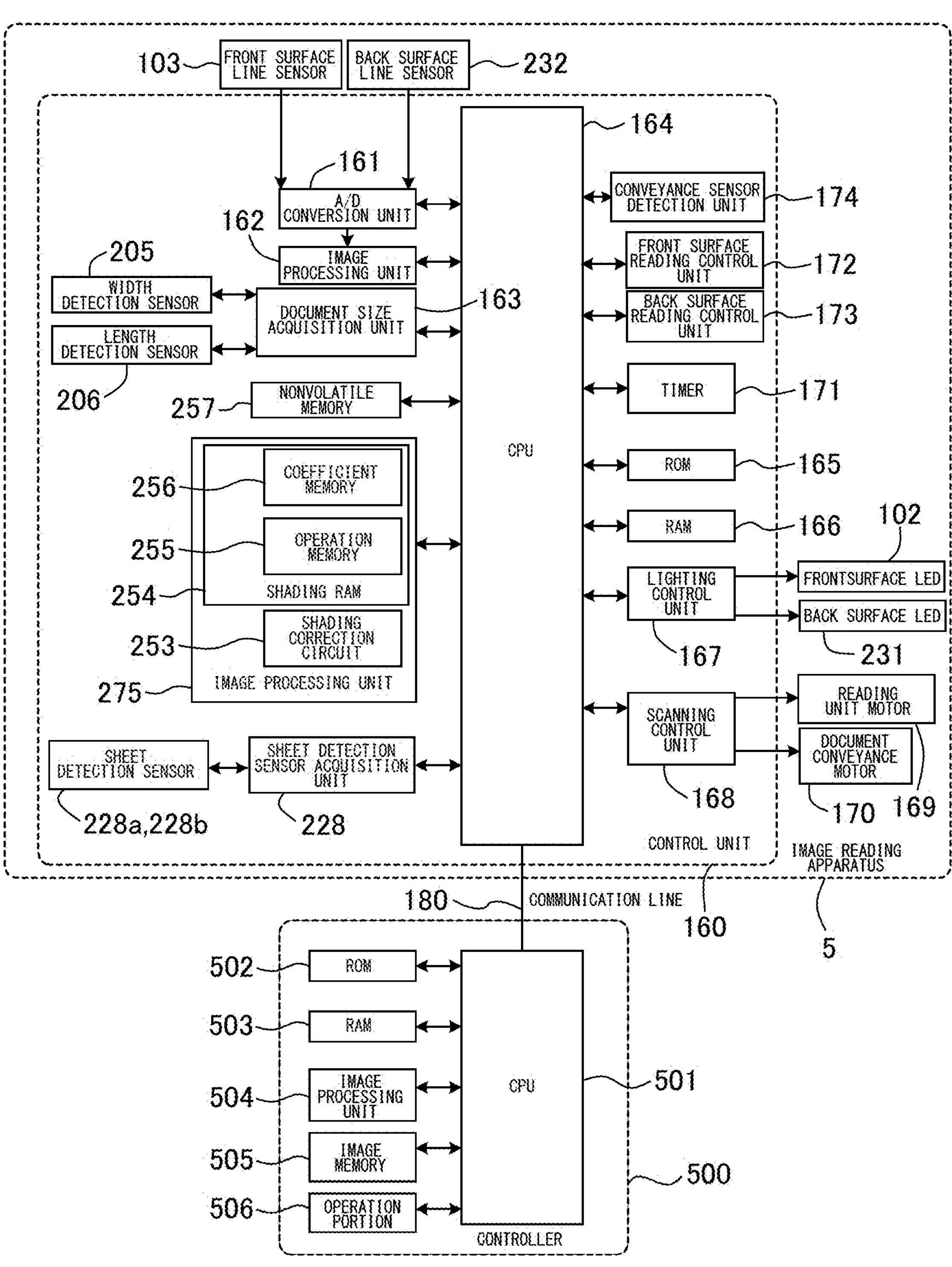
FIG. 3 is a control block diagram of the image reading apparatus according to the embodiment.

FIG. 3 is a block diagram illustrating a control system of the image reading apparatus 5 according to the present embodiment. The image reading apparatus 5 includes a CPU 164, which is a central processing unit, a ROM 165, which is a read only memory, and a RAM 166, which is a random access memory. The ROM 165 stores a control program for realizing document reading, and the RAM 166 stores input data and work data.

In the lighting control unit 167, on/off control of lighting of LEDs 102 and 231 is performed. A scanning control unit 168 executes drive control of the reading unit motor 169. The reading unit motor 169 is connected to the front surface reading unit 101 through the timing belt 151, and by the drive of the reading unit motor 169, the front surface reading unit 101 may slide on the guide 110 in a sub-scanning direction. Similarly, the scanning control unit 168 executes drive control of a document conveyance motor 170 installed in the ADF 200. The document conveyance motor 170 is connected to the separation roller 211, the registration roller pair 215, the read roller pair 217, the read roller pair 219, the read roller pair 221, and the sheet discharge roller pair 223. These rollers are rotated by the drive of the document conveyance motor 170, and a document is conveyed to a conveyance path within the ADF 200.

The front surface line sensor 103 is installed in the front surface reading unit 101, and receives light that has been irradiated by the front surface LED 102 and reflected on the document. The data is entered to an A/D conversion unit 161, where analog data is converted to digital data. Image processing is performed and image data is generated in an image processing unit 162. Similarly, the back surface line sensor 232 is installed in the back surface reading unit 230, and receives light that has been irradiated by the back surface LED 231 and reflected on the document. The subsequent processes are similar to those of the front surface, such that descriptions thereof are omitted. A document size acquisition unit 163 is for acquiring a read document size information entered through an operation portion 506 of the controller 500 described later, or for acquiring a document size information by combining the states of the width detection sensor 205 and a length detection sensor 206.

A shading RAM 254 is composed of an operation memory 255 and a coefficient memory 256, which may be accessed from the CPU 164 for reading and writing data. A nonvolatile memory 257 is a memory in which values are stored even when the power supply of the image reading apparatus 5 has been turned off. For example, it is used to store a shading target value when performing shading correction in a shading correction circuit 253, or to store alarms and error information that had occurred during jobs.

The timer 171 receives and counts pulse signals that have been output every predetermined distance by the drive of the document conveyance motor 170, and when a preset count value has expired, a timer expiration signal is transmitted to the CPU 164. Thereby, the distance that the document has proceeded may be measured. A front surface reading control unit 172 executes an image reading process. In a state where the timer value set in the timer 171 is expired and the CPU 164 receives the signal, a trigger signal is generated to the front surface reading control unit 172 and a back surface reading control unit 173. Based on this trigger, the front surface reading control unit 172 and the back surface reading control unit 173 start acquisition of document image.

A conveyance sensor detection unit 174 acquires on and off states of the respective sensors disposed on the document conveyance path, and when a document leading edge reaches the respective sensors or when a document trailing edge passes through the respective sensors, the signal thereof is transmitted to the conveyance sensor detection unit 174. This signal is received by the CPU 164 as interrupt, such that processing may be notified to the timer 171 without delay. The first sheet detection sensor 228*a* and the second sheet detection sensor 228*b* detect the skew angle of the document leading edge of the document on the uppermost surface of the document bundle separated and fed from the document tray 201.

The controller 500 converts the document image read by the image reading apparatus 5 into a form enabling image to be output to the sheet S set in the image forming apparatus 1. In addition to performing a processing to convert the image to be output by a PC, the controller 500 may control the reception of user operation or control the entire apparatus. The image reading apparatus 5 and the controller 500 are connected via a communication line 180, and various data signals of the image reading apparatus 5 and the controller 500 are sent and received through the communication line 180. The controller 500 includes a CPU 501, which is a central processing unit, a ROM 502, which is a read only memory, and a RAM 503, which is a random access memory. The ROM 502 stores a control program for realizing image conversion and control of the entire apparatus, and the RAM 503 stores input data and work data.

In an image processing unit 504, processing is performed to convert the document image read by the image reading apparatus 5 to a form that may be output by the image forming apparatus 1. The image data may be stored temporarily in an image memory 505. The operation portion 506 may be composed of a touch panel on which a screen and operation buttons are disposed, through which operations from a user may be received and various information may be output on the screen for users.

The present embodiment adopts a configuration in which each of the image reading apparatus 5 and the controller 500 have a CPU, a ROM, and a RAM, but it may also be possible to adopt a configuration in which the image reading apparatus 5 is not equipped with a CPU, and the CPU, the ROM, and the RAM of the controller 500 are used in common. In that case, the communication line 180 does not exist, and other control units connected to the CPU 164 are directly connected to the CPU 501. The present embodiment adopts a configuration where the respective CPUs are provided, but the configuration in which the CPU is shared may be realized as needed.

Skew Detection

In general, in the ADF 200, so-called "bound sheets", which are stapled sheets or bonded sheets, may not be separated and conveyed. Such sheets may be damaged during a separation motion by the separation roller 211 described above and a separation pad 226. Among such bound sheets, in the case of sheets where one end portion in the sheet width direction thereof are bound, skewing occurs to a leading edge of a first sheet by separation motion, and thereafter, the sheet will be damaged. Therefore, according to the present embodiment, skewing that has occurred to the sheet is detected by the first sheet detection sensor 228*a* and the second sheet detection sensor 228*b* disposed in a feed conveyance unit of the ADF 200, and feed conveyance processing is discontinued at that time to thereby prevent damaging of the sheet.

Figures 4A, 4B, 4C, 4D:
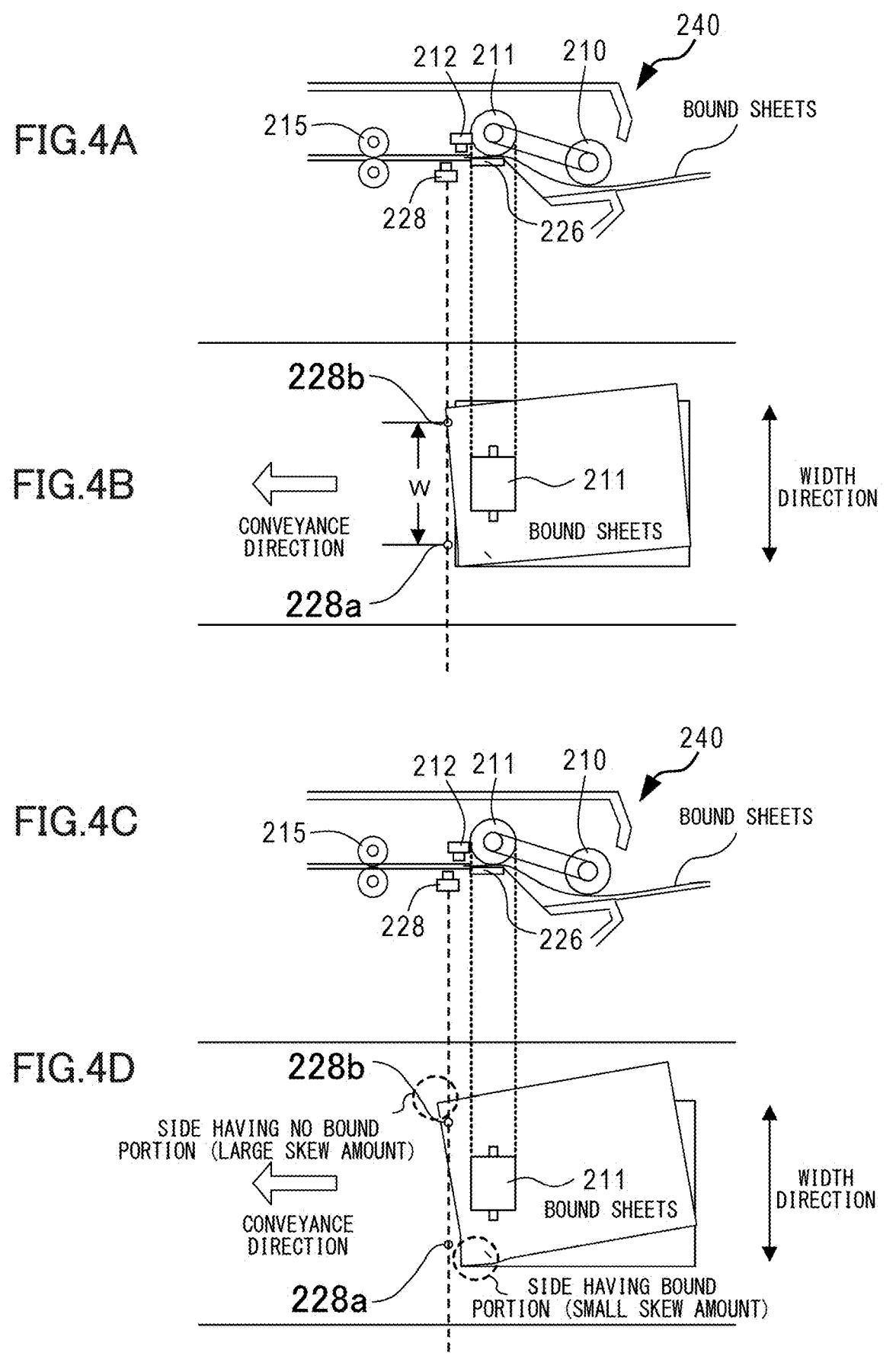
Figures 5A, 5B, 5C, 5D, 5E, 5F:
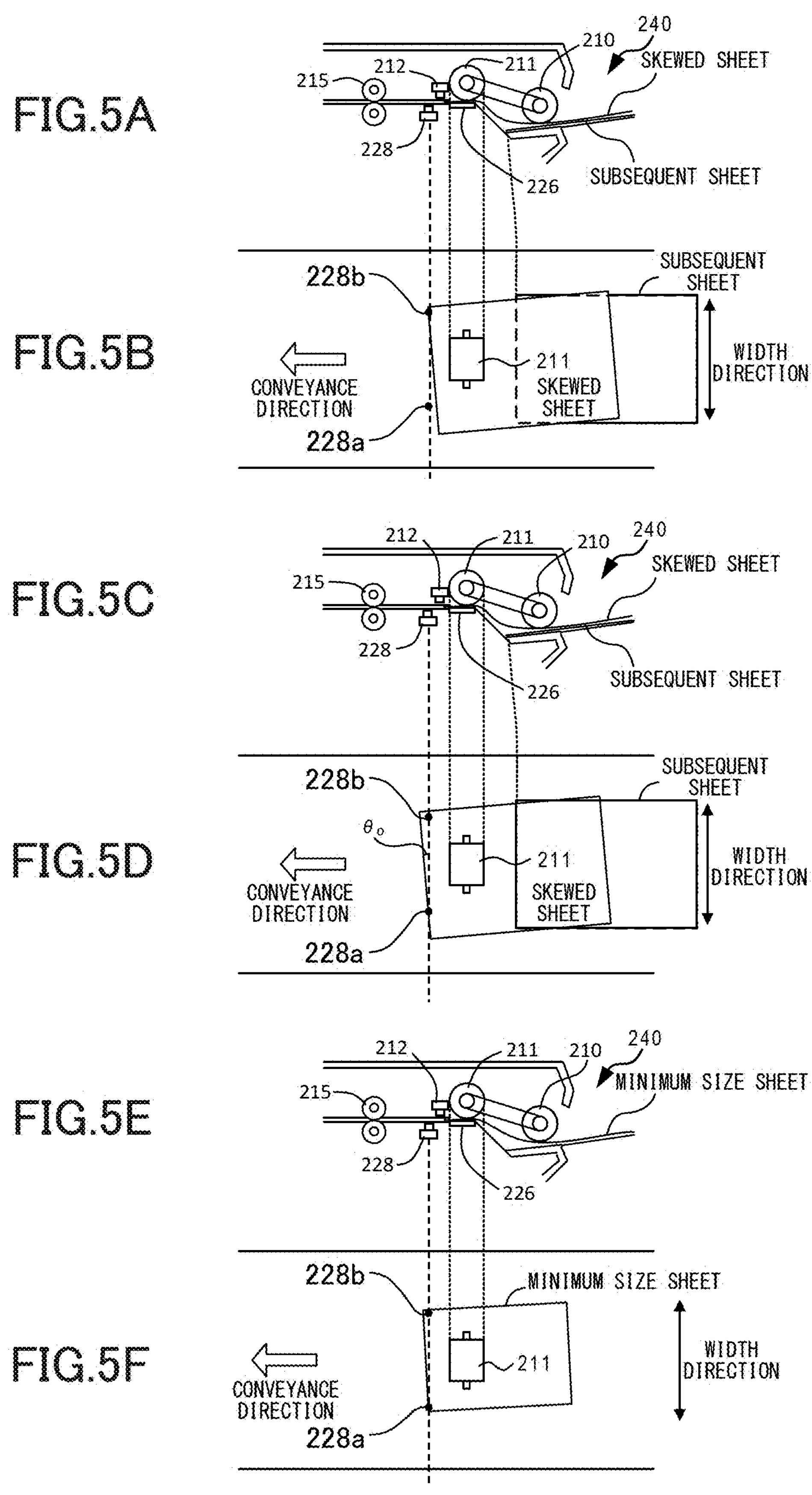
FIG. 5A is a cross-sectional view of the image reading apparatus according to the embodiment from a front side in a case where sheets are fed and a sheet has been detected by one sheet detection sensor.
FIG. 5B is a plan view of the image reading apparatus according to the embodiment in a case where sheets are fed and a sheet has been detected by one sheet detection sensor.
FIG. 5C is a cross-sectional view of the image reading apparatus according to the embodiment from a front side in a case where sheets are fed and a sheet has been detected by two sheet detection sensors.
FIG. 5D is a plan view of the image reading apparatus according to the embodiment in a case where sheets are fed and a sheet has been detected by two sheet detection sensors.
FIG. 5E is a cross-sectional view of the image reading apparatus according to the embodiment from a front side in a case where sheets are fed and a minimum size sheet has been detected.
FIG. 5F is a plan view of the image reading apparatus according to the embodiment in a case where sheets are fed and a minimum size sheet has been detected.

FIGS. 4A to 4D are explanatory views showing a portion of the ADF 200 in a case where sheets having one end portion in the sheet width direction bound is subjected to feed conveyance. FIGS. 4A and 4C are cross-sectional views of the ADF 200, and FIGS. 4B and 4D are plan views in which a conveyance path of the ADF 200 is developed into a plan view. The respective chain lines between FIGS. 4A and 4B and between FIGS. 4C and 4D show corresponding positions of respective sensors and rollers in the two drawings. Similarly, FIGS. 5A to 5F are explanatory views showing a portion of the ADF 200 in a case where a normal sheet is subjected to feed conveyance in an inclined state. FIGS. 5A, 5C, and 5E are cross-sectional views of the ADF 200, and FIGS. 5B, 5D, and 5F are plan views in which the conveyance path of the ADF 200 is developed into a plan view. The respective chain lines between FIGS. 5A and 5B, between FIGS. 5C and 5D, and between FIGS. 5E and 5F show corresponding positions of respective sensors and rollers in the two drawings.

The first sheet detection sensor 228*a* and the second sheet detection sensor 228*b* are connected to the sheet detection sensor acquisition unit 228 (refer to FIG. 3). The first sheet detection sensor 228*a* and the second sheet detection sensor 228*b* are each a sensor for detecting the leading edge of sheets, and it is composed, for example, of a photosensor. As illustrated in FIG. 4B, the first sheet detection sensor 228*a* and the second sheet detection sensor 228*b* are arranged with an interval therebetween in the sheet width direction interposing the separation roller 211. According to this arrangement, in the case of a normal sheet, which is not a bound sheet, and skewing has not occurred thereto, the first sheet detection sensor 228*a* and the second sheet detection sensor 228*b* detect the leading edge of the sheet almost simultaneously.

In the case of a bound sheet, and where skewing has occurred to the leading edge of the first sheet by separation motion, one of the sensors first detect the leading edge of the sheet, and thereafter, since the bound sheet bundle may not be conveyed downstream by the separation roller 211, the other sensor will not detect the leading edge of the sheet. In the example of FIG. 4, as illustrated in FIG. 4B, the second sheet detection sensor 228*b* detects the leading edge of the sheet. When feed conveyance of the sheet advances, as illustrated in FIG. 4D, skewing of the first sheet is enhanced by the separation motion, but still, the first sheet detection sensor 228*a* will not detect the leading edge of the sheet. If feed conveyance advances in this manner, damaging of the sheet will occur.

Meanwhile, in the case of a normal sheet and where skewing has occurred, at first, one of the sensors detects the leading edge of the sheet, and thereafter, a certain time elapses before the other sensor detects the leading edge of the sheet. In the example of FIG. 5, as illustrated in FIG. 5B, the second sheet detection sensor 228*b* detects the leading edge of the sheet. When feed conveyance of the sheet advances, as illustrated in FIG. 5D, the first sheet detection sensor 228*a* detects the leading edge of the sheet.

In the cases illustrated in FIG. 4 and FIG. 5, an approximate skew amount that has occurred to the sheet may be calculated based on an elapsed time after one of the sensors has detected the leading edge of the sheet. A conveyance speed of the sheet is denoted by V [mm/s], and a distance in the width direction between the first sheet detection sensor 228*a* and the second sheet detection sensor 228*b* is denoted by W [mm]. Further, an elapsed time from the detection of the leading edge of the sheet by one of the sensors to the detection of the leading edge of the sheet by the other sensor is denoted by t [s], and a skew amount that has occurred to the sheet is denoted by θ0. In this state, the following expression 1 is established.

$$t = W * \tan\theta 0 / V \qquad \text{(Expression 1)}$$

In the present embodiment, in a case where skewing of 3° or greater has occurred to the sheet S, the conveyance processing of the sheet is discontinued due to the risk of occurrence of damaging of the sheet by the separation motion of the bound sheet, and the document conveyance motor 170 is stopped. That is, the following expression 2 is derived as a relational expression.

$$t\theta = W * \tan\theta / V \qquad \text{(Expression 2)}$$

In Expression 2, if the other sheet detection sensor does not detect the leading edge of the sheet until the elapse of time t3° after one of the sheet detection sensors has detected the leading edge of the sheet, it is determined that skewing of 3° or greater has occurred, and the conveyance processing is discontinued. That is, skewing is determined if even only one of the first sheet detection sensor 228*a* and the second sheet detection sensor 228*b* has detected a sheet.

As illustrated in FIG. 4D, as for the skewing that has occurred to the leading edge of the sheet when a bound sheet is subjected to feed conveyance, the skew amount is small in a vicinity of the end where the bound portion exists, and the skew amount is great in the vicinity of the other end. Therefore, when detecting a bound sheet by skew detection, it is preferable that the sensors used for skew detection are arranged at positions close to the width direction ends of the sheet. By arranging the sensors used for skew detection at positions close to the width direction ends of the sheet, skewing that has occurred to the leading edge that is not on the side where the bound portion of the bound sheets is positioned may be detected, regardless of whether the bound portion is at the rear direction or at the front direction in the width direction.

In the present embodiment, as illustrated in FIGS. 5E and 5F, the first sheet detection sensor 228*a* and the second sheet detection sensor 228*b* are arranged at positions close to the width direction ends of the sheet in a state where a minimum sized sheet is fed and conveyed. Thereby, even in a case where skewing of 3° has occurred in the minimum sized sheet that may be conveyed in the ADF 200, skewing may be detected.

The skew detection as described above is effective in preventing the damaging of the bound sheet, while it is determined whether the sheet is a bound sheet based on a time difference of detection of sheet detection sensors on either side, such that the feed conveyance processing may be discontinued even in cases of documents other than bound sheets. For example, upon placing a document bundle on the document tray 201, if the documents are placed roughly without having one end thereof aligned, the states illustrated in FIGS. 5A and 5B occur, where the sheet may not be distinguished from bound sheets and the feed conveyance processing of the sheet is discontinued.

Operation Portion Display During Skew Detection

Figure 6:
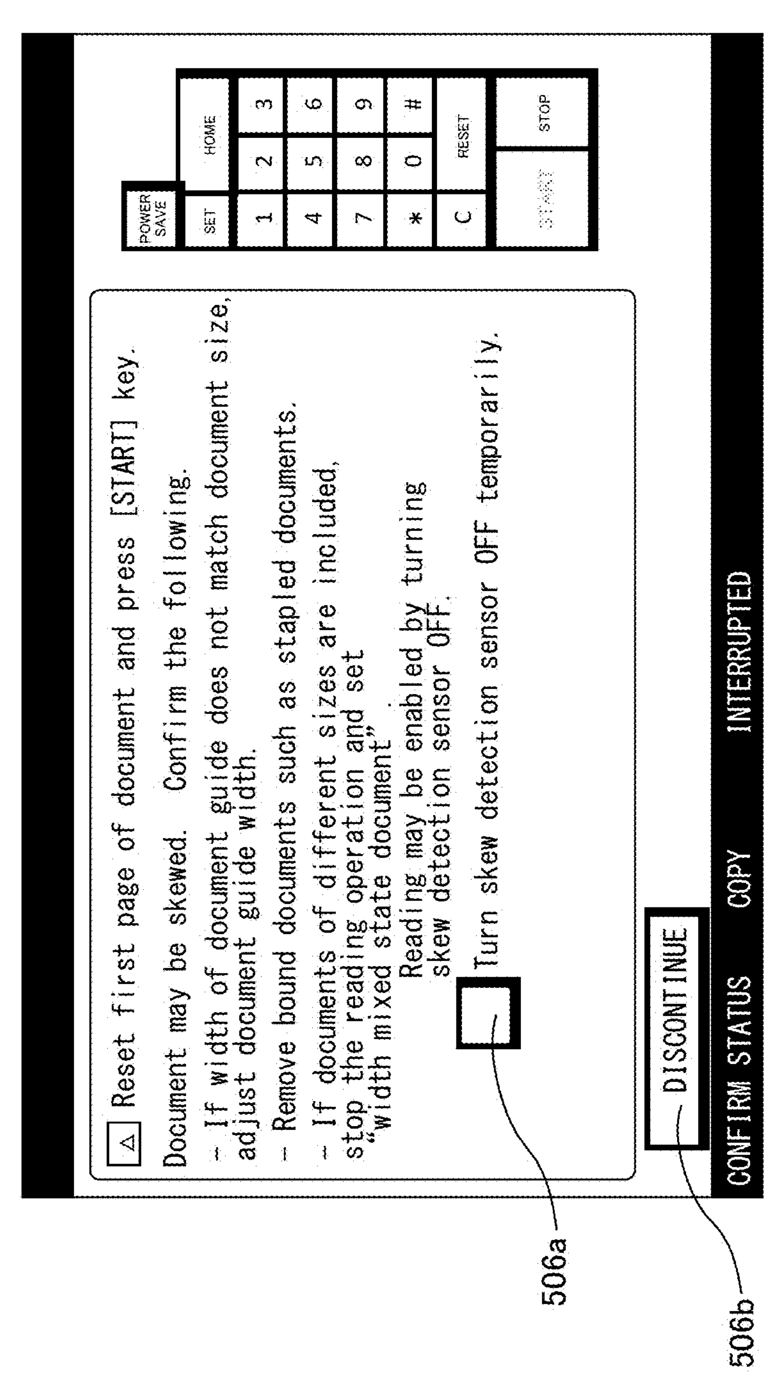
FIG. 6 is a screen displayed on an operation portion according to the embodiment in a case where conveyance has been stopped dew to skew detection.

FIG. 6 is an example of a content of a display that is displayed on the operation portion 506 when it is determined by the sheet detection sensor acquisition unit 228 that the conveyed document is skewed. This screen is splayed on the operation portion 506 simultaneously as the discontinuation of the feed conveyance processing of the sheet. When it is determined that the sheet is skewed, a content listing the possible cause of discontinuation as described above is displayed to thereby guide the user to take necessary measures. In the example, if the document that has been actually conveyed is a bound sheet, a discontinue button 506*b* is pressed to cause the job itself to be discontinued, and the user removes the document remaining in the conveyance path within the ADF 200 including the relevant bound sheets. Then, either the bound sheets are removed, or the staple needle serving as the binding medium is removed before the document bundle is placed again on the document tray 201, and the job is restarted.

If the documents that have been actually conveyed are not bound sheets but documents of the same width size, it may be possible that the documents were placed in a slanted manner when being placed on the document tray 201, or the documents were skewed due to creases and wrinkles. In the case where the documents have not been aligned at one end and placed roughly, at least one edge of the document bundle may be aligned, and then the documents may be placed again on the document tray 201. However, if the documents are in a state having a tendency to be skewed, if the documents are conveyed again, the sheet detection sensor acquisition unit 228 may determine again that the documents are skewed, and the conveyance may be interrupted. In that case, the document may not be read, such that in order to enable reading of the documents, a button 506*a* for temporarily turning the skew detection off is pressed. If this button is pressed, the corresponding information is stored in a RAM 503. When document conveyance is performed in this state, the information in the RAM 503 is transmitted via the communication line 180 to the CPU 164, and during document conveyance, either the detection by the sheet detection sensor acquisition unit 228 is not performed, or the calculation or determination of skew amount is not carried out even if detection is performed. Thereby, the job will not be interrupted, and the reading of the document bundle may be performed.

There may be a case where the conveyance speed of the document is delayed from the assumed speed due to wear or adhesion of paper dust on the conveyance unit 240, such as the pickup roller 210. In this case, the difference in detection timings of the first sheet detection sensor 228*a* and the second sheet detection sensor 228*b* becomes great, such that the skew amount of the sheet is calculated to a greater value. According to such a case, even if the actual skew amount is smaller than a threshold value for stopping conveyance, it may be possible that the skew amount is erroneously determined as exceeding the threshold value. Therefore, according to the present embodiment, the threshold value is varied based on the actual sheet speed. Hereafter, a control flow for modifying the threshold value according to the present embodiment will be described in detail.

Control Flow

Next, a control flow in a document feeding-reading job of the image reading apparatus 5 will be described with reference to FIGS. 7, 8, and 9. FIG. 7 is a flowchart of control according to the present embodiment from receiving of request to start document feeding-reading, calculating of conveyance efficiency, performing of skew detection based thereon, and reading of document image and transmitting the same to a controller 300. The processing illustrated in FIG. 7 is executed by the CPU 164 of a control unit 160 executing the program stored in the ROM 165.

When the document feeding-reading job processing is started, the control unit 160 starts conveyance of a sheet (S101). The control unit 160 determines whether the sheet has reached the separation sensor 212 (S102). If it is determined that the sheet has not reached the separation sensor 212 (S102; NO), the control unit 160 performs the determination again (S102). If it is determined that the sheet has reached the separation sensor 212 (S102; YES), the control unit 160 determines whether the sheet has reached the first sheet detection sensor 228*a* and the second sheet detection sensor 228*b* (S103). If it is determined that the sheet has not reached the first sheet detection sensor 228*a* and the second sheet detection sensor 228*b* (S103; NO), the control unit 160 performs the determination again (S103).

If it is determined that the sheet has reached the first sheet detection sensor 228*a* and the second sheet detection sensor 228*b* (S103; YES), the control unit 160 calculates a conveyance efficiency (S104). The conveyance efficiency calculation processing will be described below with reference to FIG. 8. The control unit 160 determines whether to execute skew detection based on the calculation result of conveyance efficiency (S105). If it is determined that skew detection is to be executed (S105; YES), the control unit 160 executes skew detection, and calculates a skew amount θ of the sheet (S106).

The control unit 160 determines whether the skew amount θ has exceeded a product of a threshold value T and a correction value A (S107). The threshold value T is set in advance to a skew amount that is considered to cause difficulty in reading a sheet in a normal manner, and in the present embodiment it is set to T=3°. The correction value A will be described later with reference to FIG. 8. If it is determined that the skew amount θ has exceeded the product of the threshold value T and the correction value A (S107; YES), the control unit 160 stops the conveyance of the sheet by the conveyance unit 240 since there is a risk of occurrence of sheet damage (S130).

If it is determined that the skew amount θ has not exceeded the product of the threshold value T and the correction value A (S107; NO), the control unit 160 assumed that document is fed normally. When it is determined that the skew amount θ has not exceeded the product of the threshold value T and the correction value A (S107; NO), or if it is determined in step S105 that skew detection is not to be executed, the control unit 160 waits for the sheet to reach the reading start position (S108). If it is determined that the sheet has not reached the reading start position (S108; NO), the control unit 160 waits again (S108). If it is determined that the sheet has reached the reading position (S108; YES), the control unit 160 executes the image reading process (S109). After reading the image and performing correction by image processing as needed as described above, the control unit 160 transmits the image to the controller 300 (S110). When transfer of image corresponding to one sheet is completed, the reading processing of one sheet is completed.

The control unit 160 determines whether transfer of all images has been completed (S111). If it is determined that transfer of all images have not been completed (S111; NO), the control unit 160 transmits an image to the controller 300 again (S110). When it is determined that the transfer of all images have been completed (S111; YES), the control unit 160 determines whether a subsequent sheet is on the document tray 201 (S112). If it is determined that a subsequent sheet is on the document tray 201 (S112; YES), the control unit 160 starts feeding of the subsequent sheet (S101). When it is determined that there is no sheet on the document tray 201 (S112; NO), the control unit 160 stops the conveyance after the last sheet has been conveyed (S113), since reading processing of all sheets have been completed, and the job is ended.

In the present embodiment, the control unit 160 calculates a conveyance efficiency E (S201 described later), and calculates the correction value A of threshold value of skew detection based on the acquired conveyance efficiency E (S202 described later). The conveyance efficiency E indicates a ratio of reference conveyance time to a time difference between detection timings of the first sheet detection sensor 228*a* and the second sheet detection sensor 228*b*, as described below, and it has a same meaning as an actual conveyance speed with respect to a reference conveyance speed. That is, the threshold value T may be said to be modified according to the actual conveyance speed. Further, the threshold value T is multiplied by the correction value A to correct the threshold value T, and the threshold value T after correction and the skew amount θ are compared. In the present example, the object of comparison with the threshold value Tis a skew angle θ, but the control unit 160 calculates the skew angle θ based on an elapsed time from when one of either the first sheet detection sensor 228*a* or the second sheet detection sensor 228*b* has detected a sheet. That is, the object of comparison with the threshold value T may also be referred to as the elapsed time, and the threshold value may be set with respect to the elapsed time, instead of the threshold value set with respect to the angle.

In the present embodiment, the control unit 160 determines whether the skew amount θ has exceeded a product of the threshold value T and the correction value A (S107). In contrast, the skew amount θ correlates with the elapsed time from when one of either the first sheet detection sensor 228*a* or the second sheet detection sensor 228*b* has detected a sheet, the threshold value T correlates with a threshold value time T0, and the correction value A correlates with a sheet speed. Therefore, the control unit 160 determines whether the elapsed time from when one of either the first sheet detection sensor 228*a* or the second sheet detection sensor 228*b* has detected a sheet has exceeded the threshold value time T0 that has been modified based on the sheet speed. In this case, as the sheet speed is delayed, the control unit 160 extends the threshold value time T0. That is, when the sheet speed is a first speed V1, the control unit 160 sets the threshold value time T0 to a first time T1, and when the sheet speed is a second speed V2 slower than the first speed V1, the threshold value time T0 is set to a second time T2 that is longer than the first time T1.

Further, the control unit 160 measures a time from when either one of the first sheet detection sensor 228*a* or the second sheet detection sensor 228*b* has detected a sheet. If the other one of the first sheet detection sensor 228*a* or the second sheet detection sensor 228*b* has not detected the sheet before the elapse of the threshold value time T0 (corresponding to S107; YES), the control unit 160 stops conveyance of the sheet by the conveyance unit 240 (S130). This is referred to as a first stop processing.

Calculation of Conveyance Efficiency

FIG. 8 is a flowchart of a control of calculating a conveyance efficiency, and based thereon, determining whether to execute a skew detection processing. The processing illustrated in FIG. 8 is performed by the CPU 164 of the control unit 160 executing a program stored in the ROM 165. The control unit 160 calculates the conveyance efficiency E based on a time difference of timings at which the separation sensor 212 and either one of the first sheet detection sensor 228*a* or the second sheet detection sensor 228*b* have been turned on (S201). The conveyance efficiency E is calculated by E=(reference conveyance time)/(time difference)*100. The reference conveyance time is a value obtained by dividing a distance between the sensors by a conveyance speed serving as reference of the sheet in the relevant section, and in the present embodiment, for example, it is calculated as 10 mm/350 mm/s*100 =28.6 ms. Further according to the present embodiment, the control unit 160 calculates the conveyance efficiency E based on a measured value of a sheet speed obtained in the speed detection processing that has been performed once. Therefore, a speedy skew detection according to the current reading status may be realized.

In the example, the conveyance efficiency E indicates a ratio of the reference conveyance time with respect to the time difference of detection timings of the first sheet detection sensor 228*a* and the second sheet detection sensor 228*b*, and it has a same meaning as a ratio of actual conveyance speed with respect to a reference conveyance speed. Therefore, the control unit 160 may be defined as executing a speed detection processing for measuring the speed of the sheet conveyed by the conveyance unit 240 based on the detection result of the sensor unit 241 in S201. In the present embodiment, the control unit 160 executes a speed detection processing based on the time difference between the timing at which one of either the first sheet detection sensor 228*a* or the second sheet detection sensor **228*b* has detected the sheet and the timing at which the separation sensor 212** has detected the sheet S.

The control unit 160 calculates the correction value A of threshold value of skew detection based on the calculated conveyance efficiency E (S202). The correction value A of skew detection is obtained by A=100/E. The control unit 160 determines whether the conveyance efficiency E has exceeded a threshold value Te for executing skew detection (S203). The threshold value Te for executing skew detection is a value of conveyance efficiency that is considered to allow skew detection to be executed normally, and in the present embodiment, the value is set to 50%. In the present embodiment, whether the conveyance efficiency E has exceeded the threshold value Te for executing skew detection has a same meaning as whether the actual conveyance speed is faster than a threshold value speed TV. That is, in a case where the threshold value speed TV is set to 50% of the reference speed, if the actual conveyance speed is 50% or slower of the reference speed, No is determined in S203.

If it is determined that the conveyance efficiency E has exceeded the threshold value Te for executing skew detection (S203; YES), the control unit 160 determines that skew detection may be executed normally, sets the skew detection to be executed in the current job (S204), and ends the processing of determining execution of skew detection.

If it is determined that the conveyance efficiency E has not exceeded the threshold value Te for executing skew detection (S203; NO), the control unit 160 determines that skew detection cannot be executed normally, and stops sheet conveyance (S210). That is, in a case where the measured sheet speed is slower than the threshold value speed TV, the control unit 160 executes a second stop processing of stopping the conveyance of the sheet by the conveyance unit 240 before selection of a first mode and a second mode (S212) described below. Thereby, if there is a possibility that normal skew detection may not be performed, the conveyance may be stopped immediately. The control unit 160 displays a notice warning that skew detection may not be performed normally (refer to FIG. 9) on the operation portion 506 (S211). FIG. 9 is an example of a content of a display to be displayed on the operation portion 506 when it is determined that the conveyance efficiency of the feeding unit has been deteriorated. When feed conveyance processing of the sheet is discontinued, the control unit 160 displays the same speedily on the operation portion 506.

The control unit 160 waits for input from the user regarding whether to execute skew detection (S212). That is, in a case where the measured sheet speed is slower than the threshold value speed TV, the control unit 160 may selectively execute a first mode of executing a first stop processing, i.e., skew detection, or a second mode of not executing the first stop processing, i.e., skew detection. If the user determines to execute skew detection and presses a resume button **506*d* (S212; YES), the first mode is selected, and setting is performed to execute skew detection in the current job (S213). Meanwhile, if the user determines not to execute skew detection and presses a button 506*c* to temporarily turn off the skew detection (S212; NO), the second mode is selected, and setting is performed so as not to execute skew detection in the current job (S220). As described, after executing the second stop processing (S210), the first mode or the second mode is selected, and thereafter, the control unit 160 executes the selected mode. The control unit 160 displays an instruction to place the sheet that is in midway of conveyance, or the sheet having been discharged, on the document tray 201 again to resume reading (S214), resumes sheet conveyance (S215**), and ends the determination processing of executing skew detection. In the present embodiment, when the second mode is selected, the skew detection is not executed only during the relevant job. Therefore, when the relevant job is ended and another job is executed, the selection of the first and second modes will be reset.

As described above, according to the image forming apparatus 1 of the present embodiment, if the skew amount θ is greater than the threshold value T having been corrected by the correction value A, the control unit 160 stops conveyance of the sheet (S130). Thereby, even in a case where the conveyance speed of the document becomes slower than the assumed speed due to wear or attachment of paper dust of the conveyance unit 240, the correction value A having reflected the actual conveyance speed may be used to suppress erroneous detection of the skew amount θ and determine whether to stop the sheet highly accurately.

According to the present embodiment, if it is determined that the conveyance efficiency E has not exceeded the threshold value Te for executing skew detection (S203; NO), the control unit 160 determines that skew detection cannot be performed normally, and the sheet conveyance is stopped (S210). Thereby, in a case where normal skew detection may not be performed, conveyance may be stopped immediately.

Further according to the present embodiment, in a case where the measured sheet speed is slower than the threshold value speed TV, the control unit 160 may selectively execute a first mode of executing the first stop processing, i.e., skew detection, or a second mode of not executing the first stop processing, i.e., skew detection. Thereby, the user may select an appropriate processing based on whether to prioritize skew detection of sheets or to prioritize reading speed without performing skew detection.

Other Embodiments

In the above-described embodiment, both the correction of threshold value of skew detection (S107) based on conveyance efficiency and the determination of execution of skew detection (S212) are adopted, but the present technique is not limited thereto, and either only one of the two controls may be adopted. For example, if the correction of threshold value of skew detection (S107) is not to be executed, the control unit 160 calculates the conveyance efficiency (S104), and thereafter, waits for the sheet to reach the reading start position (S108). In this case, in S104, the flow illustrated in FIG. 8 is executed. Therefore, if the measured sheet speed is slower than the threshold value speed TV, the control unit 160 executes a second stop processing of stopping the conveyance of the sheet by the conveyance unit 240. After executing the second stop processing, the control unit 160 may selectively execute the first mode of executing the first stop processing or the second mode of not executing the first stop processing, and after selecting the first mode or the second mode, executes the selected mode. Meanwhile, if the determination of execution of skew detection (S212) is not executed, either the determination on whether the conveyance efficiency E has exceeded the threshold value Te for executing skew detection (S203) is not performed, or merely a warning is displayed (S211) and the selection of the first mode and the second mode is not performed.

Flow of Utilizing Average Value

The above embodiment described a case where the control unit 160 performs calculation of the conveyance efficiency E based on the measured value of the sheet speed obtained in the speed detection processing once (S201), but the present technique is not limited thereto. For example, the control unit 160 may execute the speed detection processing for multiple times, and based on an average value calculated from the measured values of sheet speed that have been acquired in each of the speed detection processing, an average conveyance efficiency Ea may be calculated.

A processing procedure according to this case will be described with reference to FIG. 10. FIG. 10 is a flowchart of a processing of calculating the average conveyance efficiency Ea and determining whether to execute skew detection processing based thereon. The processing illustrated in FIG. 10 will be performed by the CPU 164 of the control unit 160 executing a program stored in the ROM 165.

The control unit 160 calculates the conveyance efficiency E based on a time difference of the timings at which the separation sensor 212 and either one of the first sheet detection sensor 228*a* or the second sheet detection sensor 228*b* have been turned on (S301). The control unit 160 calculates the average conveyance efficiency Ea based on the calculated conveyance efficiency E (S302). The average conveyance efficiency Ea is obtained by averaging the conveyance efficiencies for the past N number of times that have been calculated, and in the present embodiment, it is set to N=10. The average conveyance efficiency may be calculated while distinguishing the types and grammages of the conveyed sheets. The control unit 160 calculates the correction value A of the threshold value of skew detection based on the average conveyance efficiency Ea being calculated (S303). The correction value A of skew detection is calculated by A=100/Ea.

The control unit 160 determines whether the average conveyance efficiency Ea has exceeded the threshold value Te for executing skew detection (S304). When it is determined that the average conveyance efficiency Ea has exceeded the threshold value Te for executing skew detection (S304; YES), the control unit 160 determines that skew detection may be executed normally, sets the skew detection to be executed in the current job (S305), and ends the processing of determining execution of skew detection. When it is determined that the average conveyance efficiency Ea has not exceeded the threshold value Te for executing skew detection (S304; NO) the control unit 160 determines that skew detection may not be performed normally, and stops sheet conveyance (S310). The processing of S310 to S320 is similar to the processing of S210 to S220 of FIG. 8, such that descriptions thereof are omitted.

According to the other embodiment illustrated in FIG. 10 described above, the correction of threshold value of skew detection and the determination on whether to execute skew detection may be performed based on the average value of conveyance efficiency being calculated. Thereby, compared to a case where determination is performed based on a measured value performed only once, a highly accurate decision with a smaller effect of disturbance may be realized. According to the present embodiment, both the correction of threshold value of skew detection and determination on whether to execute skew detection are executed based on the average conveyance efficiency, but the present technique is not limited thereto, and it may be possible to adopt only one of the two controls.

Flow of Automatic Switching from Second Mode to First Mode

According to the embodiment described above, when the user selects a second mode in which skew detection is not executed (S212; NO), the second mode is continued and skew detection is not performed only during the current job, but the present technique is not limited thereto. For example, the second mode may be continued and skew detection may not be performed even in subsequent jobs, unless the user switches the mode to the first mode. In that case, when a predetermined condition, such as recovery of sheet speed, has been satisfied, it may be possible to automatically switch the mode to the first mode and resume skew detection. The processing procedure at this time will be described with reference to FIG. 11.

Figure 11:
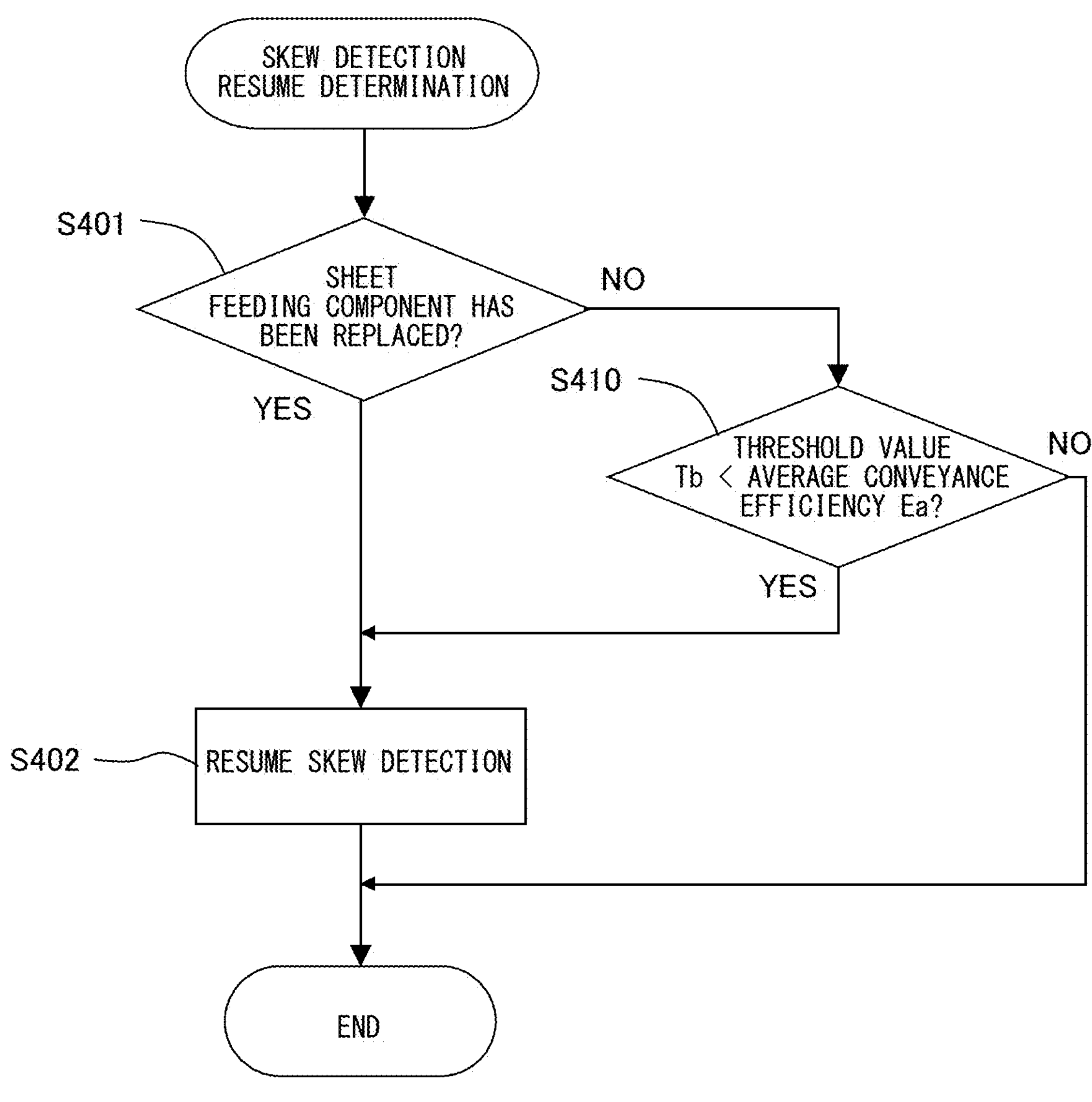
FIG. 11 is a flowchart illustrating a processing procedure of determining resuming of skew detection in the image reading apparatus according to another embodiment.

FIG. 11 illustrates an embodiment in which, when the second mode of not executing skew detection using the average conveyance efficiency Ea has been selected in S320 of FIG. 10, the second mode is continued and skew detection is stopped until a resume condition is satisfied. A processing of automatically switching from the second mode to the first mode by satisfying the resume condition according to the present embodiment will be described. FIG. 11 is a flowchart of a processing of determining whether to resume skew detection processing. The processing illustrated in FIG. 11 is performed by the CPU 164 of the control unit 160 executing the program stored in the ROM 165. In the present embodiment, a skew detection resume determination of switching from the second mode to the first mode is performed when the image reading apparatus 5 is started.

In the processing of the skew detection resume determination, the control unit 160 determines whether a sheet feeding component has been replaced (S401). In the present embodiment, after replacing the sheet feeding component, the user executes an operation to clear a consumption information of the sheet feeding component stored in the RAM 503 through the operation portion 506. By this operation, information that the sheet feeding component has been replaced is stored in the RAM 503. The control unit 160 refers to the information in the RAM 503, and if it is determined that the sheet feeding component has been replaced (S401; YES), the control unit 160 assumes that the deterioration of conveyance efficiency has been resolved, and resumes skew detection (S402).

The control unit 160 refers to the information in the RAM 503, and if it is determined that the sheet feeding component has not been replaced (S401; NO), whether the average conveyance efficiency Ea has exceeded a threshold value Tb is determined. The threshold value Tb refers to a conveyance efficiency that has been improved by some reason and skew detection is considered resumable based on the conveyance efficiency, and according to the present embodiment, the threshold value Tb is 90%. If it is determined that the average conveyance efficiency Ea has exceeded the threshold value Tb (S410; YES), the control unit 160 resumes skew detection (S402). If it is determined that the average conveyance efficiency Ea has not exceeded the threshold value Tb (S410; NO), the control unit 160 does not resume skew detection, and ends the skew detection resume determination processing. As described, after the second mode has been selected, if the speed of the sheet S conveyed by the conveyance unit 240 has become equal to or greater than the threshold value speed, the control unit 160 automatically switches the mode from the second mode to the first mode and executes the same.

According to the other embodiment illustrated in FIG. 11 described above, in the embodiment where skew detection is stopped continuously until a resume condition is satisfied in a state where the second mode in which skew detection is not executed is selected, the mode is automatically switched to the first mode to resume skew detection. Thereby, even if the user forgets to switch the setting to the first mode in a state where skew detection may be performed, the mode is switched automatically to the first mode, such that skew detection may be executed.

According to the present embodiment, control is performed based on the average conveyance efficiency Ea, but control may be based on the conveyance efficiency E computed each time without being averaged. Further according to the present embodiment, the determination to resume skew detection is set to when the image reading apparatus 5 is started, but the present technique is not limited thereto, and for example, the determination timing may be set arbitrarily, such as when a new job is started. According to the present embodiment, an example has been illustrated of a case where, after replacing a sheet feeding component, the user executes an operation for clearing the consumption information of the sheet feeding component stored in the RAM 503 through the operation portion 506, but the present technique is not limited thereto. For example, the control unit 160 may automatically acquire a history of component replacement and to store the same in the RAM 503 automatically.

Speed Detection Processing Without Using Sheet Detection Sensor

According to the embodiment described above, either one of the first sheet detection sensor 228*a* or the second sheet detection sensor 228*b* used for skew detection is used as one of two sensors for detecting the speed of a sheet used for calculating the conveyance efficiency E, but the present technique is not limited thereto. For example, a sensor for detecting speed that is positioned at the same position as the first sheet detection sensor 228*a* and the second sheet detection sensor 228*b* in the conveyance direction may be provided, and the sensor may be used together with the separation sensor 212 to detect speed.

As another example, speed may be detected using the separation sensor 212 and an extraction sensor 227. The extraction sensor 227 is an example of a fourth sensor, and detects a sheet conveyed by the conveyance unit 240 at a fourth detection position that is a position that differs from the third detection position in the conveyance direction. Further, the sensor unit 241 includes the first sheet detection sensor 228*a*, the second sheet detection sensor 228*b*, the separation sensor 212, and the extraction sensor 227. In this case, the extraction sensor 227 is arranged downstream in the conveyance direction of the first sheet detection sensor 228*a* and the second sheet detection sensor 228*b*, such that a determination performed using the detection result of skew detection is delayed until the conveyance speed, i.e., the conveyance efficiency E, is calculated. The processing procedure performed in this case will be described below.

Flow of Delaying Skew Detection Until Conveyance Efficiency is Calculated

FIG. 12 is a flowchart of calculating a conveyance efficiency using the separation sensor 212 disposed upstream of the first sheet detection sensor 228*a* and the second sheet detection sensor 228*b* used for skew detection and the extraction sensor 227 disposed downstream thereof, and performing skew detection control based thereon. The processing illustrated in FIG. 12 is performed by the CPU 164 of the control unit 160 executing a program stored in the ROM 165.

Next, with reference to FIG. 12, an embodiment of delaying a determination using a detection result of skew detection until the conveyance efficiency is calculated will be described. When the document feeding-reading job processing is started, the control unit 160 starts conveying a sheet (S501). The control unit 160 determines whether the sheet has reached the separation sensor 212 (S502). If it is determined that the sheet has not reached the separation sensor 212 (S502; NO), the control unit 160 performs the determination again (S502). If it is determined that the sheet has reached the separation sensor 212 (S502; YES), the control unit 160 executes skew detection and calculates a skew amount θ of the sheet (S503). At this point of time, the skew amount θ of the sheet is calculated, but the control unit 160 will not determine whether to stop conveyance of the sheet using the skew amount until the calculation of conveyance efficiency is completed.

The control unit 160 determines whether the sheet has reached the extraction sensor 227 (S504). If it is determined that the sheet has not reached the extraction sensor 227 (S504; NO), the control unit 160 performs the determination again (S504). If it is determined that the sheet has reached the extraction sensor 227 (S504; YES), the control unit 160 calculates the conveyance efficiency (S505).

The control unit 160 determines whether to execute skew detection based on the calculation result of conveyance efficiency (S506). If it is determined to execute skew detection (S506; YES), the control unit 160 determines whether to stop conveyance of the sheet based on the skew detection result (S507). If it is determined that skew detection is not to be performed (S506; NO), the control unit 160 waits until the sheet reaches the reading start position (S508). The processing of S507 to S531 are similar to S107 to S131 of FIG. 7, such that descriptions thereof are omitted.

That is, in the present flow, at first, the control unit 160 acquires a second time difference between the timing at which the first sheet detection sensor 228*a* detects the sheet S and a timing at which the second sheet detection sensor 228*b* detects the sheet (S503). Then, the control unit 160 executes a speed detection processing based on a first time difference between the timing at which the separation sensor 212 detects the sheet and a timing at which the extraction sensor 227 detects the sheet (S505). The control unit 160 modifies a threshold value time based on the speed of the sheet acquired by speed detection processing (S507). When the second time difference exceeds the threshold value time that has been modified (S507; YES), the control unit 160 executes a first stop processing of stopping conveyance of the sheet (S530).

According to the other embodiment illustrated in FIG. 12 described above, even according to a sensor configuration in which the calculation of conveyance efficiency is delayed from the skew detection processing, by waiting for a decision using the skew detection result, it may be possible to correct the threshold value of skew detection based on the conveyance efficiency and perform determination using the skew detection result. Thereby, the degree of freedom of the usable sensors may be increased.

The present embodiment has been described based on a case where both the correction of threshold value of skew detection based on the conveyance efficiency and the determination of execution of skew detection are executed, but the present technique is not limited thereto, and it may be possible to adopt only one of the two control operations. Further, when the user decides not to execute skew detection, it may be possible to adopt a setting not to perform skew detection, not only in the current job but continuously until the user performs a resume setting.

The respective embodiments described above have been illustrated based on an example where the sheet conveyance apparatus is applied to the feeding unit 7 of the image reading apparatus 5, but the present technique is not limited thereto. The sheet conveyance apparatus according to the present invention may be applied to any type of sheet conveyance apparatus that conveys sheets in the image reading apparatus 5 or in the image forming apparatus 1.

According to the present invention, deterioration of skew detection accuracy of sheets may be suppressed in sheet conveyance apparatuses, image reading apparatuses, and image forming apparatuses.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-026833, filed Feb. 26, 2024, which is hereby incorporated by reference herein in its entirety.

What is claimed is:

1. A sheet conveyance apparatus comprising:
- a supporting tray on which a sheet is supported;
- a conveyance unit configured to convey the sheet in a conveyance direction, the conveyance unit including a rotating member and a separation portion together configured to separate sheets supported on the supporting tray one by one;
- a sensor unit including:
  - a first sensor configured to detect the sheet conveyed by the conveyance unit at a first detection position; and
  - a second sensor configured to detect the sheet conveyed by the conveyance unit at a second detection position that is different from the first detection position in a width direction orthogonal to the conveyance direction; and
- a control unit configured to:
  - execute a first stop processing of stopping conveyance of the sheet by the conveyance unit in a case where, until a threshold value time has elapsed after one of the first sensor or the second sensor has detected the sheet, the other one of the first sensor or the second sensor does not detect the sheet;
  - execute a speed detection processing of measuring a speed of the sheet conveyed by the conveyance unit based on a detection result of the sensor unit;
  - set the threshold value time to:
    - a first time in a case where the speed of the sheet measured in the speed detection processing is a first speed; and
    - a second time that is longer than the first time in a case where the speed of the sheet measured in the speed detection processing is a second speed that is slower than the first speed.

2. The sheet conveyance apparatus according to claim 1, wherein:
- the sensor unit includes a third sensor configured to detect the sheet conveyed by the conveyance unit at a third detection position that is different from the first detection position and the second detection position in the conveyance direction, and
- the control unit is configured to execute the speed detection processing based on a time difference between a timing at which one of the first sensor or the second sensor detects the sheet and a timing at which the third sensor detects the sheet.

3. The sheet conveyance apparatus according to claim 1, wherein:
- the sensor unit includes:
  - a third sensor configured to detect the sheet conveyed by the conveyance unit at a third detection position; and
  - a fourth sensor configured to detect the sheet at a fourth detection position that is different from the third detection position in the conveyance direction, and
- the control unit is configured to execute the speed detection processing based on a first time difference between a timing at which the third sensor detects the sheet and a timing at which the fourth sensor detects the sheet.

4. The sheet conveyance apparatus according to claim 3, wherein:
- the fourth detection position is arranged downstream of the first detection position and the second detection position in the conveyance direction, and
- the control unit is configured to:
  - acquire a second time difference between a timing at which the first sensor detects the sheet and a timing at which the second sensor detects the sheet;
  - execute the speed detection processing based on the first time difference;
  - modify the threshold value time based on a speed of the sheet acquired in the speed detection processing; and
  - execute the first stop processing in a case where the second time difference exceeds the threshold value time that has been modified.

5. The sheet conveyance apparatus according to claim 1, wherein, in a state where a speed of the sheet being measured is slower than a threshold value speed, the control unit is configured to selectively execute a first mode of executing the first stop processing or a second mode of not executing the first stop processing.

6. The sheet conveyance apparatus according to claim 5, wherein the control unit is configured to execute:
- a second stop processing of stopping conveyance of the sheet by the conveyance unit before selection of the first mode or the second mode in a case where a speed of the sheet being measured is slower than the threshold value speed; and
- a selected mode after the first mode or the second mode has been selected after executing the second stop processing.

7. The sheet conveyance apparatus according to claim 5, wherein, after the second mode has been selected, in a state where a speed of the sheet conveyed by the conveyance unit changes to be equal to or faster than the threshold value speed, the control unit is configured to automatically switch the second mode to the first mode and execute the first mode.

8. The sheet conveyance apparatus according to claim 1, wherein the control unit is configured to modify the threshold value time based on a measured value of a speed of the sheet acquired in the speed detection processing once.

9. The sheet conveyance apparatus according to claim 1, wherein the control unit is configured to execute the speed detection processing for multiple times, and modify the threshold value time based on an average value that has been calculated from measured values of speed of the sheet acquired in each of the speed detection processing.

10. An image reading apparatus comprising:
- the sheet conveyance apparatus according to claim 1; and an image reading unit configured to read an image formed on a sheet conveyed by the sheet conveyance apparatus.

11. An image forming apparatus comprising:

the image reading apparatus according to claim 10; and an image forming unit configured to form an image on a sheet based on an information of an image read by the image reading apparatus.

12. A sheet conveyance apparatus comprising:

a supporting tray on which a sheet is supported;

a conveyance unit configured to convey the sheet in a conveyance direction, the conveyance unit including a rotating member and a separation portion together configured to separate sheets supported on the supporting tray one by one;

a sensor unit including:

a first sensor configured to detect the sheet conveyed by the conveyance unit at a first detection position; and a second sensor configured to detect the sheet conveyed by the conveyance unit at a second detection position that differs from the first detection position in a width direction orthogonal to the conveyance direction; and a control unit configured to:

execute a first stop processing of stopping conveyance of the sheet by the conveyance unit in a case where skewing of the sheet has been detected based on a detection result of the sensor unit;

execute a speed detection processing of measuring a speed of the sheet conveyed by the conveyance unit based on the detection result of the sensor unit; and in a state where the speed of the sheet measured in the speed detection processing is slower than a threshold value speed:

execute a second stop processing of stopping conveyance of the sheet by the conveyance unit; and after executing the second stop processing, selectively execute a first mode of executing the first stop processing or a second mode of not executing the first stop processing.

13. The sheet conveyance apparatus according to claim 12, wherein:

the sensor unit includes a third sensor configured to detect the sheet conveyed by the conveyance unit at a third detection position that is different from the first detection position and the second detection position in the conveyance direction, and the control unit is configured to execute the speed detection processing based on a time difference between a timing at which one of the first sensor or the second sensor detects the sheet and a timing at which the third sensor detects the sheet.

14. The sheet conveyance apparatus according to claim 12, wherein:

the sensor unit includes a third sensor configured to detect the sheet conveyed by the conveyance unit at a third detection position, and a fourth sensor configured to detect the sheet at a fourth detection position that is different from the third detection position in the conveyance direction, and the control unit is configured to execute the speed detection processing based on a first time difference between a timing at which the third sensor detects the sheet and a timing at which the fourth sensor detects the sheet.

15. The sheet conveyance apparatus according to claim 14, wherein:

the fourth detection position is arranged downstream of the first detection position and the second detection position in the conveyance direction, and the control unit is configured to:

acquire a second time difference between a timing at which the first sensor detects the sheet and a timing at which the second sensor detects the sheet;

execute the speed detection processing based on the first time difference;

modify a threshold value time based on a speed of the sheet acquired in the speed detection processing, and execute the first stop processing in a case where the second time difference exceeds the threshold value time that has been modified.

16. The sheet conveyance apparatus according to claim 12, wherein, after the second mode has been selected, if a speed of the sheet conveyed by the conveyance unit changes to be equal to or faster than the threshold value speed, the control unit is configured to automatically switch the second mode to the first mode and execute the first mode.

17. The sheet conveyance apparatus according to claim 12, wherein the control unit is configured to modify a threshold value time based on a measured value of a speed of the sheet acquired in the speed detection processing once.

18. The sheet conveyance apparatus according to claim 12, wherein the control unit is configured to execute the speed detection processing for multiple times, and modify a threshold value time based on an average value that has been calculated from measured values of speed of the sheet acquired in each of the speed detection processing.

19. An image reading apparatus comprising:

the sheet conveyance apparatus according to claim 12; and an image reading unit configured to read an image formed on a sheet conveyed by the sheet conveyance apparatus.

20. An image forming apparatus comprising:

the image reading apparatus according to claim 19; and an image forming unit configured to form an image on a sheet based on an information of an image read by the image reading apparatus.

* * * * *